(12) United States Patent
Ta

(10) Patent No.: US 10,402,642 B2
(45) Date of Patent: Sep. 3, 2019

(54) AUTOMATICALLY CONVERTING INK STROKES INTO GRAPHICAL OBJECTS

(71) Applicant: Microsoft Technology Licensing, LLC, Redmond, WA (US)

(72) Inventor: Lasifu Ta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/601,248

(22) Filed: May 22, 2017

(65) Prior Publication Data

US 2018/0335932 A1    Nov. 22, 2018

(51) Int. Cl.
  *G06K 9/00*  (2006.01)
  *G06T 11/00*  (2006.01)
  *G06F 3/0488*  (2013.01)

(52) U.S. Cl.
  CPC ..... *G06K 9/00463* (2013.01); *G06F 3/04883* (2013.01); *G06K 9/00416* (2013.01); *G06T 11/001* (2013.01)

(58) Field of Classification Search
  None
  See application file for complete search history.

(56) References Cited

U.S. PATENT DOCUMENTS

| | | | | |
|---|---|---|---|---|
| 7,120,872 B2* | 10/2006 | Thacker | ............... | G06F 3/0481 |
| | | | | 715/209 |
| 7,352,902 B2* | 4/2008 | Li | ............... | G06K 9/222 |
| | | | | 382/206 |
| 7,593,574 B2 | 9/2009 | Simard et al. | | |
| 2005/0100218 A1* | 5/2005 | Guha | ............... | G06K 9/222 |
| | | | | 382/187 |
| 2006/0210163 A1* | 9/2006 | Garside | ............... | G06F 3/04883 |
| | | | | 382/186 |
| 2008/0205772 A1* | 8/2008 | Blose | ............... | G06F 17/3028 |
| | | | | 382/225 |
| 2008/0313565 A1* | 12/2008 | Albertson | ............... | G06F 3/0481 |
| | | | | 715/825 |

(Continued)

OTHER PUBLICATIONS

Hse, et al., "Robust Sketched Symbol Fragmentation using Templates", In Proceedings of the 9th international conference on Intelligent user interfaces, Jan. 13, 2004, 5 pages.

(Continued)

*Primary Examiner* — Hadi Akhavannik

(57) ABSTRACT

A system for automatically converting hand-drawn shapes into graphical objects is provided. In aspects, a user's intention to convert a hand-drawn shape into a computer-generated graphical may be inferred when the user traces over a previously hand-drawn shape. For instance, after receiving a first ink stroke forming a drawn shape, the system may receive at least a second ink stroke that substantially overlays the first ink stroke. When the system detects that the user substantially traced over the drawn shape, it may be determined that the user intends to beautify the drawn shape. Thereafter, in response to identifying a graphical object corresponding to the drawn shape, the system may replace the drawn shape with the graphical object on a drawing canvas. Accordingly, the user may indicate an intention to automatically beautify a hand-drawn shape without switching to an edit mode or otherwise selecting the hand-drawn shape for editing.

20 Claims, 30 Drawing Sheets

(56) References Cited

U.S. PATENT DOCUMENTS

| | | | |
|---|---|---|---|
| 2009/0199123 A1* | 8/2009 | Albertson | G06F 3/04845 715/772 |
| 2013/0136377 A1 | 5/2013 | Luo et al. | |
| 2013/0188877 A1 | 7/2013 | Gulwani et al. | |
| 2014/0281947 A1 | 9/2014 | Zitnick | |
| 2014/0300609 A1* | 10/2014 | Kang | G06F 3/04883 345/467 |
| 2016/0179365 A1 | 6/2016 | Angelov | |
| 2016/0253300 A1* | 9/2016 | Tu | G06F 3/04845 345/619 |

OTHER PUBLICATIONS

Xie, et al., "Stroke-Based Stylization Learning and Rendering with Inverse Reinforcement Learning", In Proceedings of the 24th International Conference on Artificial Intelligence, Jul. 25, 2015, 7 pages.

Cheema, et al., "QuickDraw Improving Drawing Experience for Geometric Diagrams", In Proceedings of the SIGCHI Conference on Human Factors in Computing Systems, May 5, 2012, pp. 1037-1046.

* cited by examiner

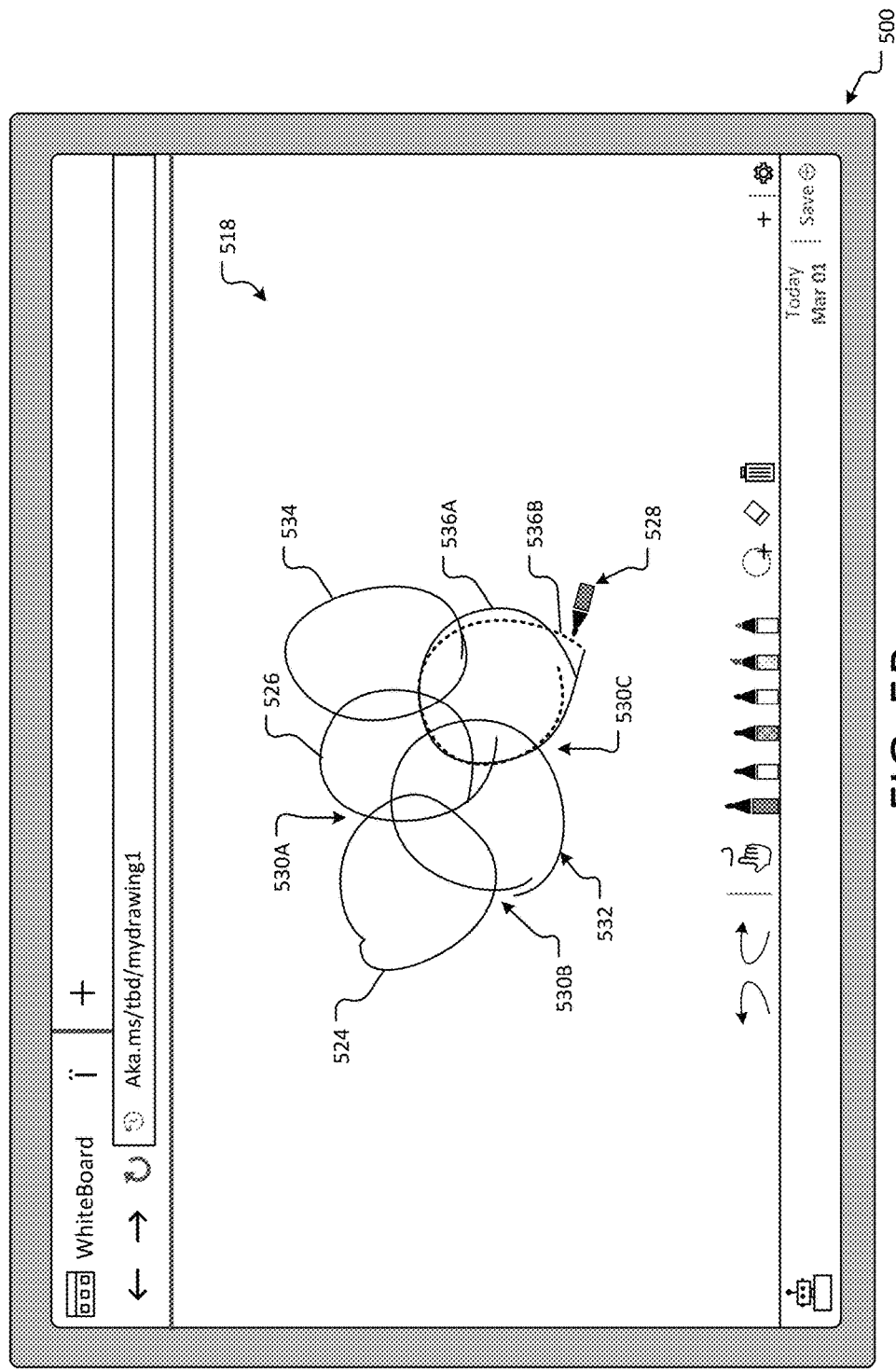

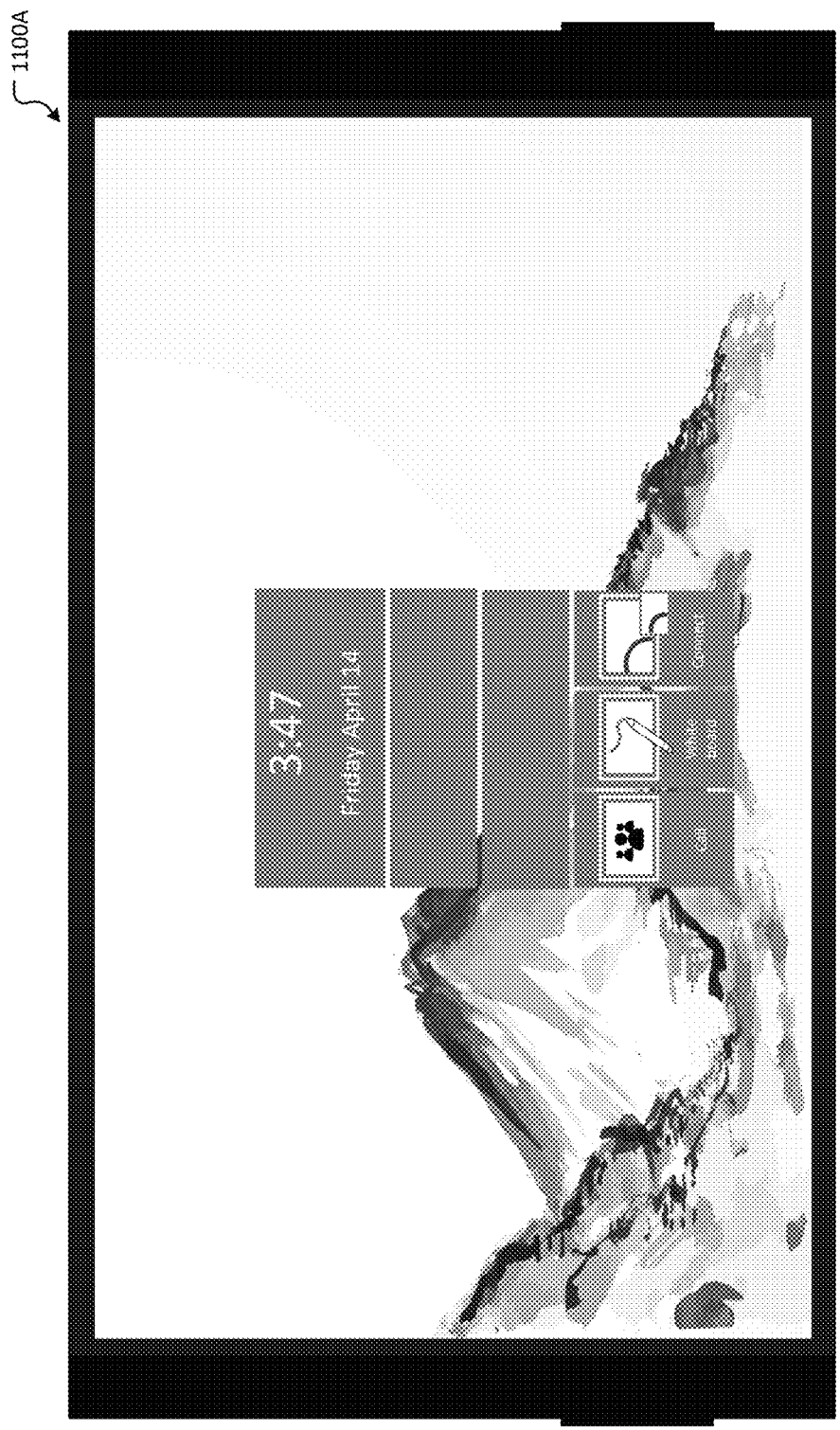

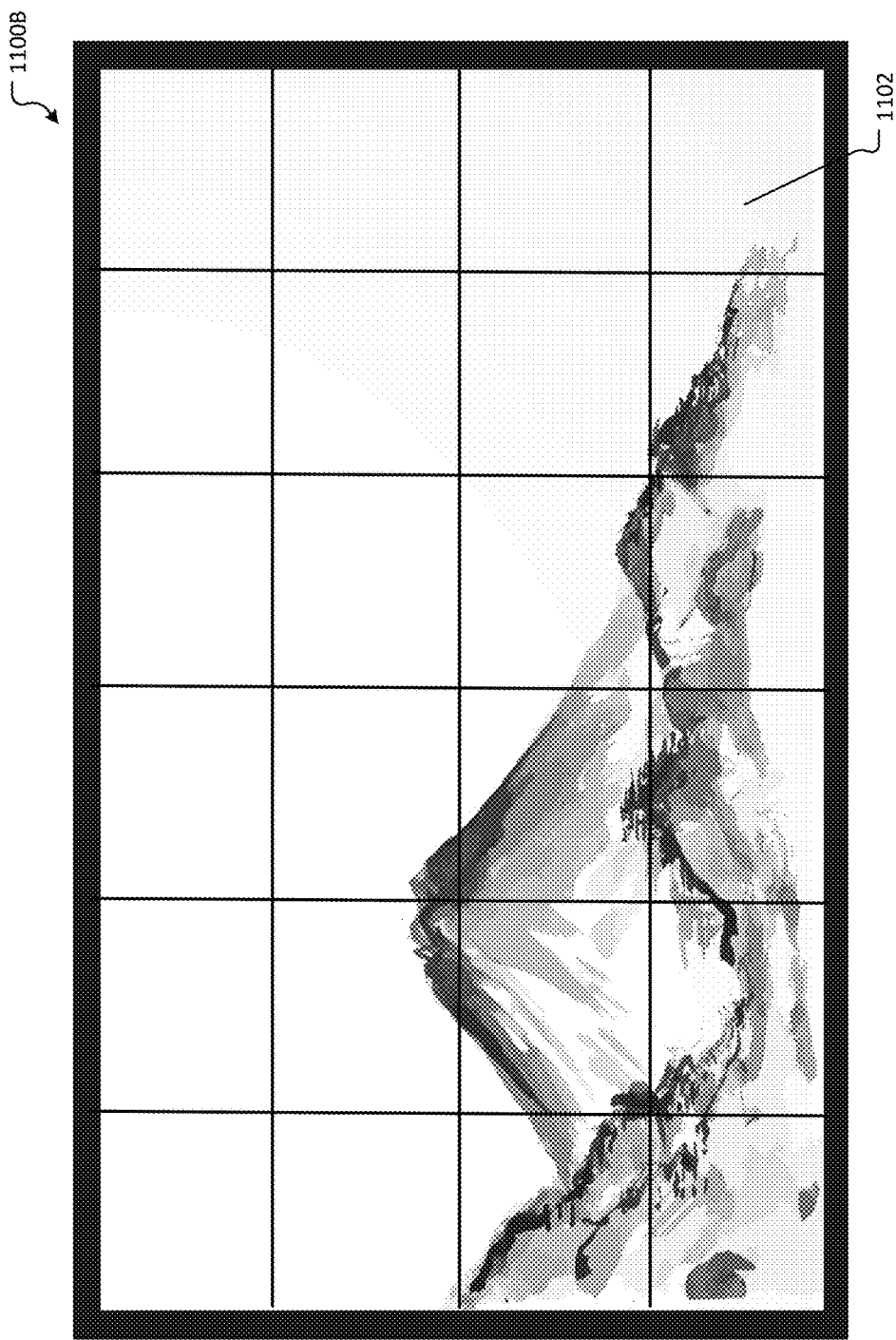

AUTOMATICALLY CONVERTING INK STROKES INTO GRAPHICAL OBJECTS

BACKGROUND

The ability to use freehand to provide drawing input onto display interfaces of computing devices has become commonplace. Many users use touch, a stylus or virtual "pens" or "brushes" to draw lines and ink strokes on a virtual canvas provided by display interfaces of computing devices. For example, smartphones, tablets, large whiteboard devices and many laptops feature touch-sensitive display screens where users can open a canvas application to draw shapes and figures by touching the screen or using a stylus.

In recent years, features of such drawing tools have become more advanced, enabling users to draw using a variety of types of virtual pens and brushes. For example, users may draw shapes with different line thickness, brush type, color, effect and/or shade. Additionally, applications may provide menus or functionality for selecting (or "lassoing") a hand-drawn figure, and manually associating the figure with a user interface or editing mode. Accordingly, once drawn, the figure can be selected and edited to change line thickness, color, texture, etc. Additionally, a user may select a hand-drawn figure for conversion to a corresponding, application-generated graphical object. In this way, a user may "beautify" a hand-drawn figure by replacing it with a computer-generated graphical object. However, in this case, it can be cumbersome to switch the interface mode between drawing and editing. This is especially true when users are running drawing applications on large-screen whiteboards and other devices. In this case, users may need to walk from one side of the whiteboard to another in order to turn on an editing mode. Alternatively, to prevent needing to switch back and forth between interface modes, some applications automatically convert hand-drawn figures into graphical objects as the shapes are drawn. However, many users feel these automated features are too aggressive and, in fact, result in undermining the utility of a "drawing" application by essentially replacing it with a prefabricated graphical template application.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by automatically detecting a user intention to convert a hand-drawn shape into a computer-generated graphical object. In aspects, the user intention may be inferred when the user traces over a previously hand-drawn shape. For instance, after receiving one or more first ink strokes forming a drawn shape, the system may receive one or more second ink strokes that substantially overlay the one or more first ink strokes. In this case, when the system detects that the user has substantially traced over the drawn shape, the system may determine that the user intends to beautify the drawn shape. In response to identifying a graphical object corresponding to the drawn shape, the system may replace the drawn shape with the graphical object on the drawing canvas. For example, a user may input a first set of ink strokes (e.g., drawn by hand, using touch or input devices such as a stylus) to draw a shape similar to a circle. In aspects, a "set" of ink strokes may include one or more ink strokes. However, the user may decide that the circle-like shape does not look as circular as the user intended. Then, the user may input a second set of ink strokes that substantially retraces or overlaps the previous set of ink strokes (e.g., the first set of ink strokes). In this way, the computing system may infer the user's intention to beautify the hand-drawn circle and may replace the hand-drawn circle with a graphical circle. In aspects, a user intention to "beautify" a shape corresponds to a user intention to replace a drawn shape with a graphical object.

Additionally, in some cases, the system may determine whether a user intends to beautify a composite figure that consists of multiple shapes (e.g. a drawing of a house, the logo of the Olympic Games™, etc.). In aspects, the user may express an intention to beautify a composite figure by re-drawing at least one shape associated with the composite figure. For instance, if the user retraces at least one shape that is adjacent to or overlapping another shape within the composite figure, the system may determine that the user intends to beautify the at least one shape. Additionally, in response to determining that the at least one shape is adjacent to and/or overlaps one or more other shapes of the composite figure, the system may further provide a prompt to the user. In aspects, the prompt may request a confirmation regarding whether the user wishes to beautify each shape of the composite figure, selected shapes, or only the at least one shape. Alternatively, in response to determining that the user intends to beautify the at least one shape, the system may automatically beautify each shape within the composite figure.

In yet another aspect, the system may determine that a graphical flowchart shape should be inserted within a pre-formatted graphical flowchart when a drawn shape overlaps at least a portion of the graphical flowchart, where the overlapped portion of the graphical flowchart may include a graphical flowchart shape, a transition, or other element. For example, if a user draws a rectangle over a transition between two graphical rectangles in a graphical flowchart, the system may determine that the user intends to insert a graphical rectangle between the two graphical rectangles within the graphical flowchart. Accordingly, in response to this determination, the system may generate and insert a graphical rectangle. Additionally, the system may generate and insert graphical transitions between each of the three graphical rectangles. Alternatively, if a user draws a diamond over a transition between two graphical rectangles in a graphical flowchart, the system may determine that the user intends to insert a graphical diamond between the two graphical rectangles to indicate a decision tree within the graphical flowchart. Accordingly, in response to this determination, the system may generate and insert a graphical diamond. Additionally, the system may generate Yes/No or True/False graphical transitions for association with the graphical diamond within the graphical flowchart.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description that follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 5A through 5E depict a graphical user interface for automatically converting ink strokes into graphical objects, according to an example embodiment.

FIG. 11A illustrates a large-screen interactive computing device for executing one or more aspects of the present disclosure.

FIG. 11B illustrates a plurality of interoperative computing devices that provide a tiled screen display for executing one or more aspects of the present disclosure.

DETAILED DESCRIPTION

Figure 1:
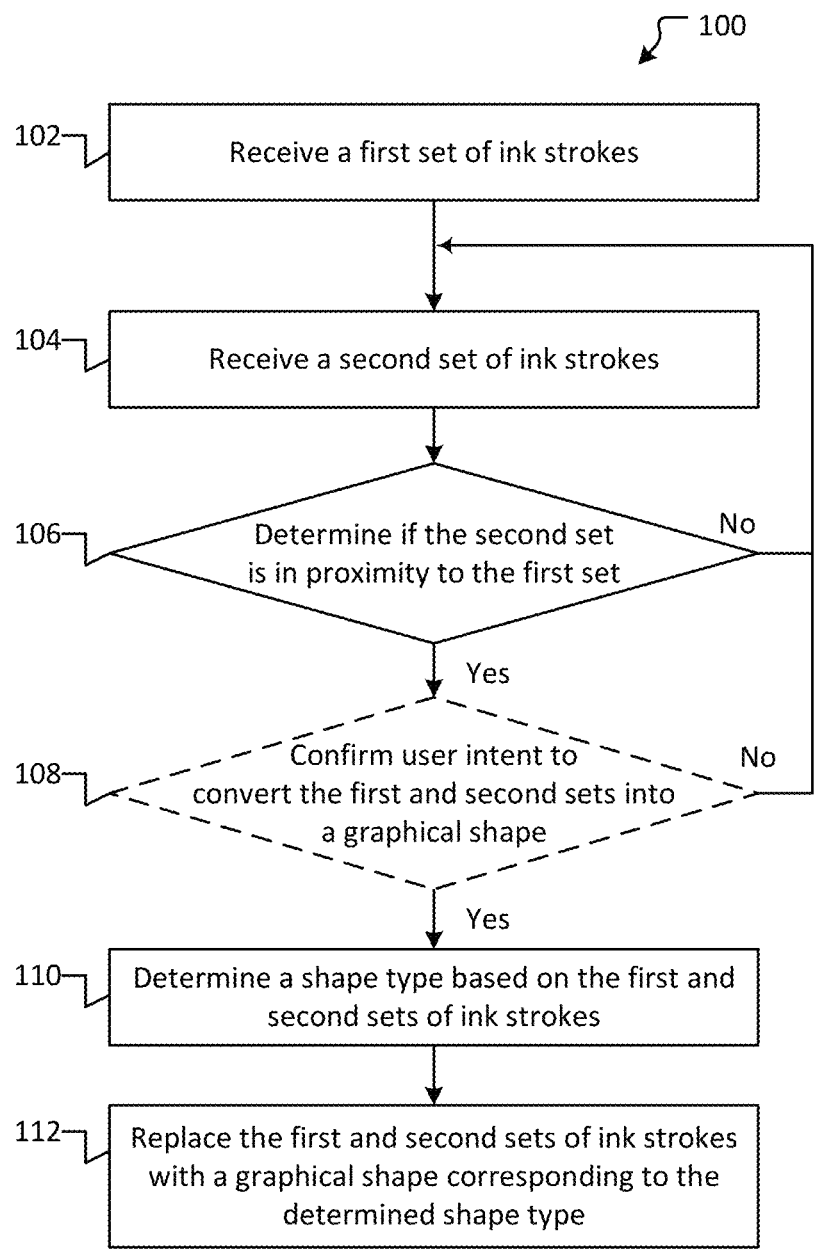
FIG. 1 illustrates a method for automatically converting ink strokes to graphical objects, according to an example embodiment.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, a software implementation or an implementation combining software and hardware aspects. The following detailed description is, therefore, not to be taken in a limiting sense.

Systems and methods are disclosed that automatically convert drawn shapes into graphical objects. In aspects, a graphical object may include but is not limited to graphical shapes, graphical transitions and/or graphical text. According to the present disclosure, the systems and methods may automatically detect a user intention to convert a hand-drawn shape into a computer-generated graphical object. In aspects, the user intention may be inferred when the user traces over a previously hand-drawn shape. For instance, after receiving one or more first ink strokes forming a drawn shape, the system may receive one or more second ink strokes that substantially overlay the one or more first ink strokes. In this case, when the system detects that the user has substantially traced over the drawn shape, the system may determine that the user intends to beautify the drawn shape. Thereafter, in response to identifying a graphical object corresponding to the drawn shape, the system may replace the drawn shape with the graphical object on a drawing canvas. Accordingly, the user may indicate an intention to automatically beautify a hand-drawn shape without switching to an edit mode or otherwise selecting the hand-drawn shape for editing.

For example, a user may input a first set of ink strokes (e.g., drawn by hand, using touch or input devices such as a stylus, etc.) to draw a shape similar to a circle. In aspects, a "set" of ink strokes may include one or more ink strokes. However, the user may decide that the circle-like shape does not look as circular as the user intended. Then, the user may input a second set of ink strokes that substantially retraces or overlaps the previous set of ink strokes (e.g., the first set of ink strokes). In this way, the computing system may infer the user's intention to beautify the hand-drawn circle and may replace the drawn circle with a graphical circle. In aspects, a user intention to "beautify" a shape corresponds to a user intention to replace a drawn shape with a computer-generated graphical object. Accordingly, the systems and methods herein do not require a user to switch modes or initiate a user interface to select a drawn shape for conversion into a graphical object. Rather, the system may automatically determine a user's intention to convert the drawn shape into a graphical object by detecting that the user has substantially redrawn (or retraced) the drawn shape. In this way, the system eliminates cumbersome steps requiring frequent switches between different modes and/or selecting menu options within a user interface—especially in cases where the screen is very large such as on-the-wall multi-panel displays. On the other hand, the present systems and methods may automatically convert only those drawn shapes for which a user intention to convert to a graphical object has been determined.

Additionally, in some cases, the system may determine whether a user intends to beautify a composite figure that consists of multiple shapes (e.g. a drawing of a house, the logo of the Olympic Games, etc.). In aspects, the user may express an intention to beautify a composite figure by re-drawing at least one shape associated with the composite figure. For instance, if the user retraces at least one shape that is adjacent to or overlapping another shape within the composite figure, the system may determine that the user intends to beautify the at least one shape. Additionally, in response to determining that the at least one shape is adjacent to and/or overlaps one or more other shapes of the composite figure, the system may further provide a prompt to the user. In aspects, the prompt may request a confirmation regarding whether the user wishes to beautify each shape of the composite figure, selected shapes, or only the at least one shape. Alternatively, in response to determining that the user intends to beautify the at least one shape, the system may automatically beautify each shape within the composite figure.

In yet another aspect, the system may determine that a graphical flowchart shape should be inserted within a pre-formatted graphical flowchart when a drawn shape overlaps at least a portion of the graphical flowchart, where the overlapped portion of the graphical flowchart may include a graphical flowchart shape, a transition, or other element. For example, if a user draws a rectangle over a transition between two graphical rectangles in a graphical flowchart, the system may determine that the user intends to insert a graphical rectangle between the two graphical rectangles within the graphical flowchart. Accordingly, in response to this determination, the system may generate and insert a graphical rectangle. Additionally, the system may generate and insert graphical transitions between each of the three graphical rectangles. Alternatively, if a user draws a diamond over a transition between two graphical rectangles in a graphical flowchart, the system may determine that the user intends to insert a graphical diamond between the two graphical rectangles to indicate a decision tree within the graphical flowchart. Accordingly, in response to this determination, the system may generate and insert a graphical diamond. Additionally, the system may generate Yes/No or True/False graphical transitions for association with the graphical diamond within the graphical flowchart.

FIG. 1 illustrates a method 100 for automatically converting ink strokes to graphical objects, according to an example embodiment.

At receive operation 102, a first set of ink strokes may be received through user interactions with a user interface. For example, a user may employ touch or an input device such as a stylus to select one or more virtual pens or brushes to draw a shape on a touch-sensitive screen. For instance, a first set of ink strokes may depict a shape with a particular type of brush or pen, color, thickness, and other parameters. As indicated above, a set of ink strokes may involve one or more ink strokes. In some aspects, the shape drawn by the first set of ink strokes may correspond to any recognizable closed shape, e.g., any type of trapezoid, ellipses, triangle, polygon, etc. In other aspects, the shape drawn by the first set of ink strokes may not correspond to a recognizable closed shape, e.g., a zigzag, a curve, a line, a dashed line, a wavy line, a scribble, loops, etc.

At receive operation 104, a second set of ink strokes may be received. As should be appreciated, the second set of ink strokes may include any of the shapes identified above for the first set of ink strokes, whether closed or open, recognized or not.

At determine operation 106, it may be determined whether the second set of ink strokes is in proximity to the first set of ink strokes by determining a distance between the two sets of ink strokes and/or determining an extent to which the second set of ink strokes overlaps the first set of ink strokes. For example, in a first evaluation, it may be determined whether the first set of ink strokes and the second set of ink strokes depict substantially the same shape. That is, if the first set of ink strokes and the second set of ink strokes each depicts an ellipsis, even if the ellipses are not dimensioned identically, it may be determined that the first set of ink strokes and the second set of ink strokes depict substantially the same shape. In this case, the combination of the first and second sets of ink strokes may form the "drawn shape" referenced herein. On the other hand, if the first set of ink strokes depicts a rectangle and the second set of ink strokes depicts a circle, it may be determined that the first and second sets of ink strokes do not depict substantially the same shape.

Additionally, at determine operation 106, it may be determined whether the first and second sets of ink strokes are within a certain distance of one another (e.g., within a certain number of pixels, a certain measured distance within the display, etc.) and/or whether the first and second sets of ink strokes substantially overlap one another (e.g., by at least a predetermined percentage, such as but not limited to, 70%-100%, 51%-100%, etc.). In further aspects, it may be determined whether the second set of ink strokes occurred within a threshold amount of time after the first set of ink strokes. That is, if the second set of ink strokes occurred within a similar time period (e.g., same hour, same day, etc.) of the first set of ink strokes, it may be determined that the user intended to beautify a drawn shape represented by the first and second sets of ink strokes. In contrast, if the second set of ink strokes did not occur within a similar time period (e.g., same hour, same day, etc.) of the first set of ink strokes, it may be determined that the user did not intend to beautify a drawn shape represented by the first set of ink strokes but rather may have intended to draw a new shape with the second set of ink strokes.

In some aspects, more than two sets of ink strokes (e.g., a third set of ink strokes, a fourth set of ink strokes, etc.) may be evaluated to determine whether a user intends to beautify multiple drawn shapes. Alternatively, in other aspects, a single set of ink strokes may indicate that a user wishes to beautify a drawn shape. For instance, if a user draws a shape overlapping at least a portion of a flowchart (e.g., between graphical objects representing flow steps and/or over a flowchart transition), it may be determined that the user intends to insert a graphical object into the flowchart (e.g., a graphical object corresponding to the drawn shape overlapping at least the portion of the flowchart). In some cases, before selecting a graphical object, at least one other graphical object within the flowchart may be evaluated. In this way, the selected graphical object may correspond with both the drawn shape and at least one other graphical object within the flowchart. If the second set of ink strokes is determined not to be in proximity to the first set of ink strokes, the method may return to receive operation 104. If the second set of ink strokes is determined to be in proximity to the first set of ink strokes, the method may progress to optional confirm operation 108.

At optional confirm operation 108, a user intent to beautify the drawn shape may be confirmed. For example, a prompt may be displayed to the user on or near the two sets of ink strokes. The prompt may be provided as a popup, text box, overlay, or other display interface. In aspects, the prompt may request confirmation from the user for converting the drawn shape (e.g., the first and second sets of ink strokes) into a graphical object. For example, the user may accept the conversion through a variety of user interactions such as via typing, pressing a pen on the screen, or a time lapse without a response. In other cases, in response to determining that second set of ink strokes is in proximity of the first set of ink strokes, the drawn shape may automatically be converted into a graphical object.

At determine operation 110, a corresponding shape may be determined based on the first and the second sets of ink strokes. As described above, it may be determined whether the first set of ink strokes and the second set of ink strokes depict substantially the same shape. At determine operation 110, the shape type represented by the first and second sets of ink strokes may be identified. For example, the drawn shape may be compared to a plurality of types of shapes to identify a matching shape type to the drawn shape. Thereafter, a graphical object corresponding to the matching shape type may be selected from a store of graphical objects. For example, a circle shape type may be determined to be the closest matching shape type to the drawn shape and a graphical circle may be selected from a store of graphical objects.

At replace operation 112, the first and second sets of ink strokes may be replaced by the graphical object that was determined to correspond to the two sets of the ink strokes. In some examples, the graphical object may also be sized to substantially correspond to a size of the drawn shape depicted by the first and second ink strokes.

As should be appreciated, operations 102-112 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 2A through 2D depict a graphical user interface for automatically converting ink strokes into graphical objects, according to an example embodiment. In particular, FIGS. 2A through 2D depict different views of a graphical user interface 200 displaying multiple sets of ink strokes according to an example embodiment.

Figure 2A:
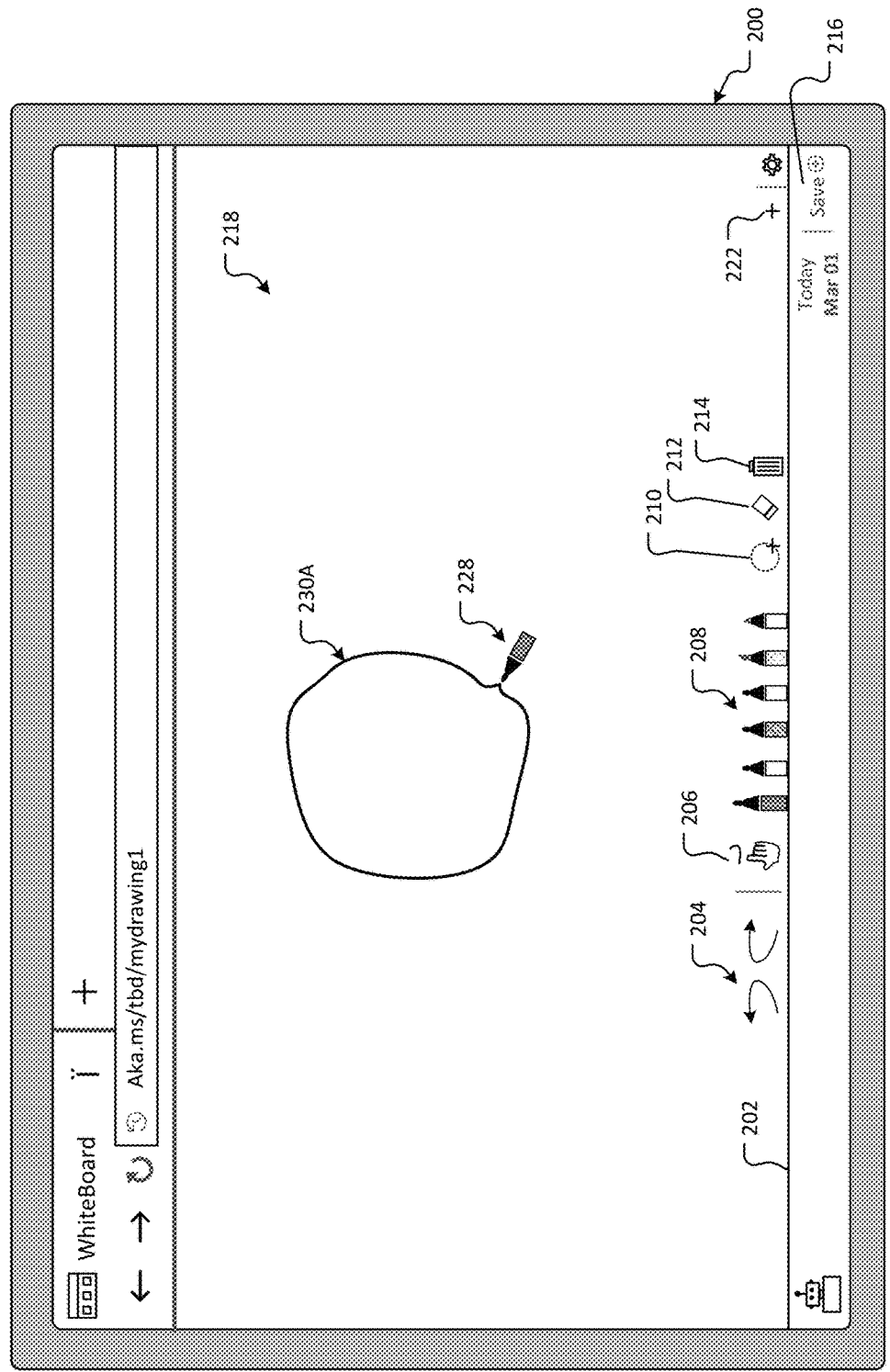
FIGS. 2A through 2D depict a graphical user interface for automatically converting ink strokes to graphical objects, according to an example embodiment.

FIG. 2A illustrates a first view of an interface 200 associated with an inking application. An inking application (or drawing application) converts user input (e.g., via touch, stylus, keyboard, mouse, or otherwise) into a virtual pen or brush to allow a user to create freeform drawings, handwritten notes, charts, etc., on a drawing canvas interface. Inking applications may be executed on many different types of devices, from mobile devices to large, multi-screen computing devices or electronic whiteboards. As illustrated, interface 200 is associated with an electronic whiteboard (e.g., Microsoft® Surface Hub®); however, interface 200 may be associated with any suitable computing device (e.g., mobile phone, tablet, phablet, laptop, personal computer, etc.). In aspects, the electronic whiteboard may include a single device or multiple devices (e.g., multiple interactive tiles) in coordination to form the interface.

Interface 200 includes drawing canvas 218 and a toolbar 202. Drawing canvas 218 may be configured to receive various types of input, e.g., touch input, mouse input, keyboard input, stylus input, etc. Input onto the drawing canvas 218 may result in one or more ink strokes being displayed on the electronic whiteboard interface 200. For instance, each input may result in an ink stroke, which may correspond to a line, a curve, a shape, an alphanumeric letter or number, etc. Toolbar 202 may include a number of controls for interacting with the electronic whiteboard interface. For example, toolbar 202 may include undo/redo controls 204 for deleting an immediately prior ink stroke (e.g., "undo") or replacing the immediately prior deleted ink stroke (e.g., "redo"). Touch control 206 may enable the drawing canvas 218 to enter a "fingerpainting mode" for receiving touch input. Pen gallery 208 may allow for selection of different colored pens and brushes for freehand input of ink strokes on the drawing canvas 218. Lasso control 210 may allow for selection of a group of objects (ink, pictures, etc.) in order to manipulate the group (e.g., move, resize, delete, copy, cut, etc.). Eraser control 212 may enable partial or full deletion of one or more ink strokes. Trash control 214 may discard the ink strokes, graphics, etc., associated with drawing canvas 218. Insert control 222 may add a new drawing canvas and/or may pan the viewable display area to the right or to the left to provide an additional drawing area within the drawing canvas. Selection of a save control 216 may store the current drawing canvas.

Graphical user interface 200 may be provided by any display interface associated with any type of computing device (or a combination of computing devices), e.g., a large-screen interactive computing device (e.g., whiteboard or Microsoft® Surface Hub®), a plurality of interoperative computing devices that provide a tiled screen display, a mobile telephone, a smart phone, a tablet, a phablet, a personal computer, a desktop computer, a laptop computer, a gaming device/computer (e.g., Xbox®), a television, and the like. As illustrated by FIG. 2A, a first set of ink strokes 230A has been received within drawing canvas 218. Additionally, a pen indicator 228 (or a cursor) is displayed at or near the first set of ink strokes 230A. For example, a virtual pen (or brush) may be selected from pen gallery 208 and used to input the first set of ink strokes 230A. In this case, a cursor position for the virtual pen is indicated by pen indicator 228.

Figure 2B:
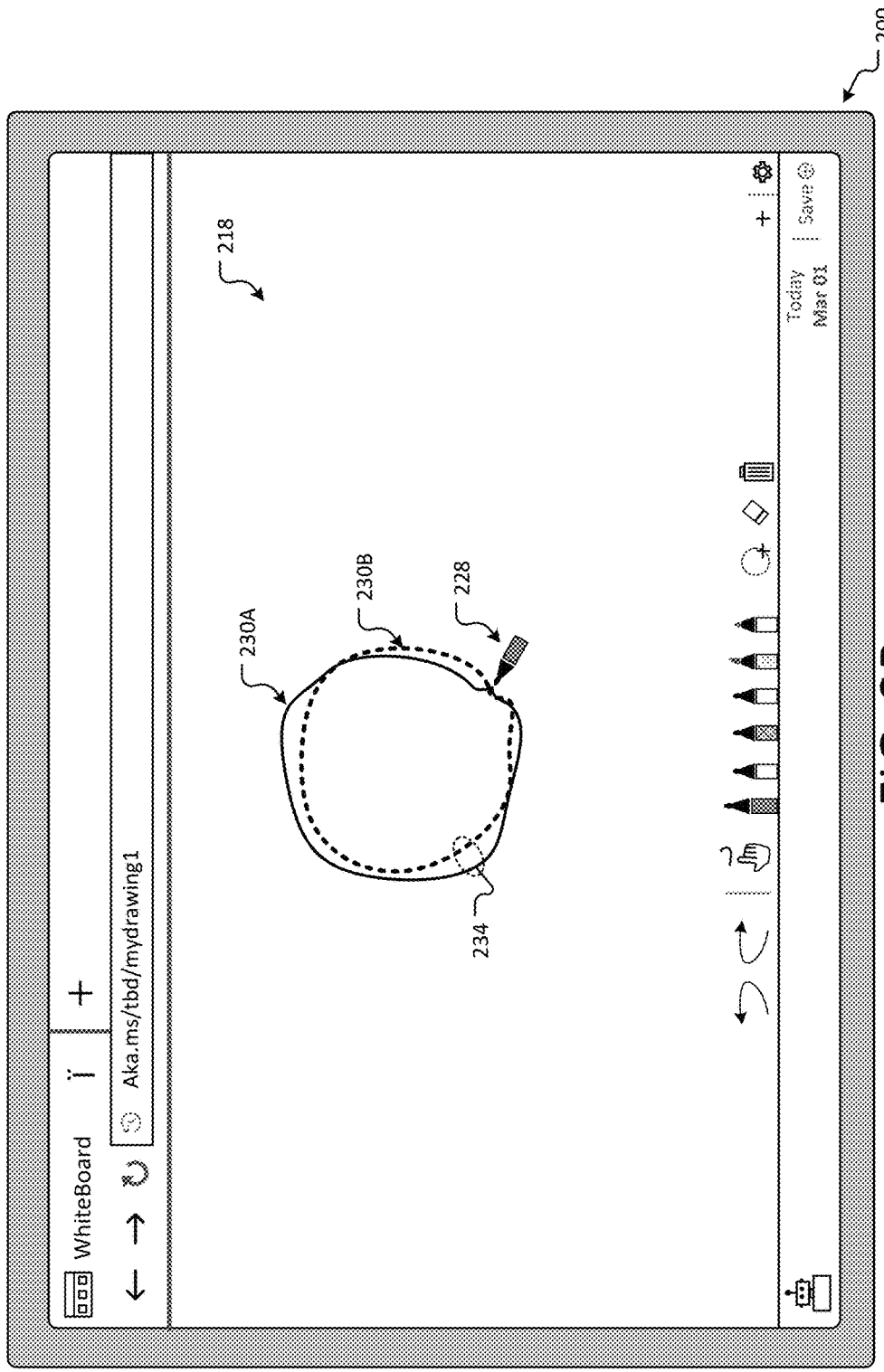

FIG. 2B depicts a second view of interface 200 in which a second set of ink strokes 230B has been received on drawing canvas 218. As illustrated, the first set of ink strokes 230A is displayed with a solid line and the second set of ink strokes 230B is displayed with a dotted line. However, in other aspects, the first set of ink strokes 230A and the second set of ink strokes 230B may be distinguished from one another via any suitable means, e.g., via different line weight, different line color, different line shade, etc. In still further aspects, the first and second sets of ink strokes may not be distinguishable unless the user selects a different virtual pen or brush, color, etc. for inputting the second set of ink strokes 230B.

In some cases, the user may draw the second set of ink strokes 230B such that it substantially retraces the first set of ink strokes 230A. In this way, the user may express an intention to draw a more uniform or beautified shape. In order to determine whether the second set of ink strokes substantially retraces the first set of ink strokes, the system may determine a distance 234 between the first set of ink strokes 230A and the second set of ink strokes 230B. In aspects, distance 234 may be determined at a number of points between the first set of ink strokes 230A and the second set of ink strokes 230B in order to determine whether the first and second sets of ink strokes are in close proximity. In other aspects, a "degree" of overlap may be determined by determining a percentage of overlapping regions between the first set of ink strokes 230A and the second set of ink strokes 230B (e.g., 51%-100% overlap). As should be appreciated, there are a number of different methods for identifying whether the user intended to retrace the first set of ink strokes with the second set of ink strokes.

Figure 2C:
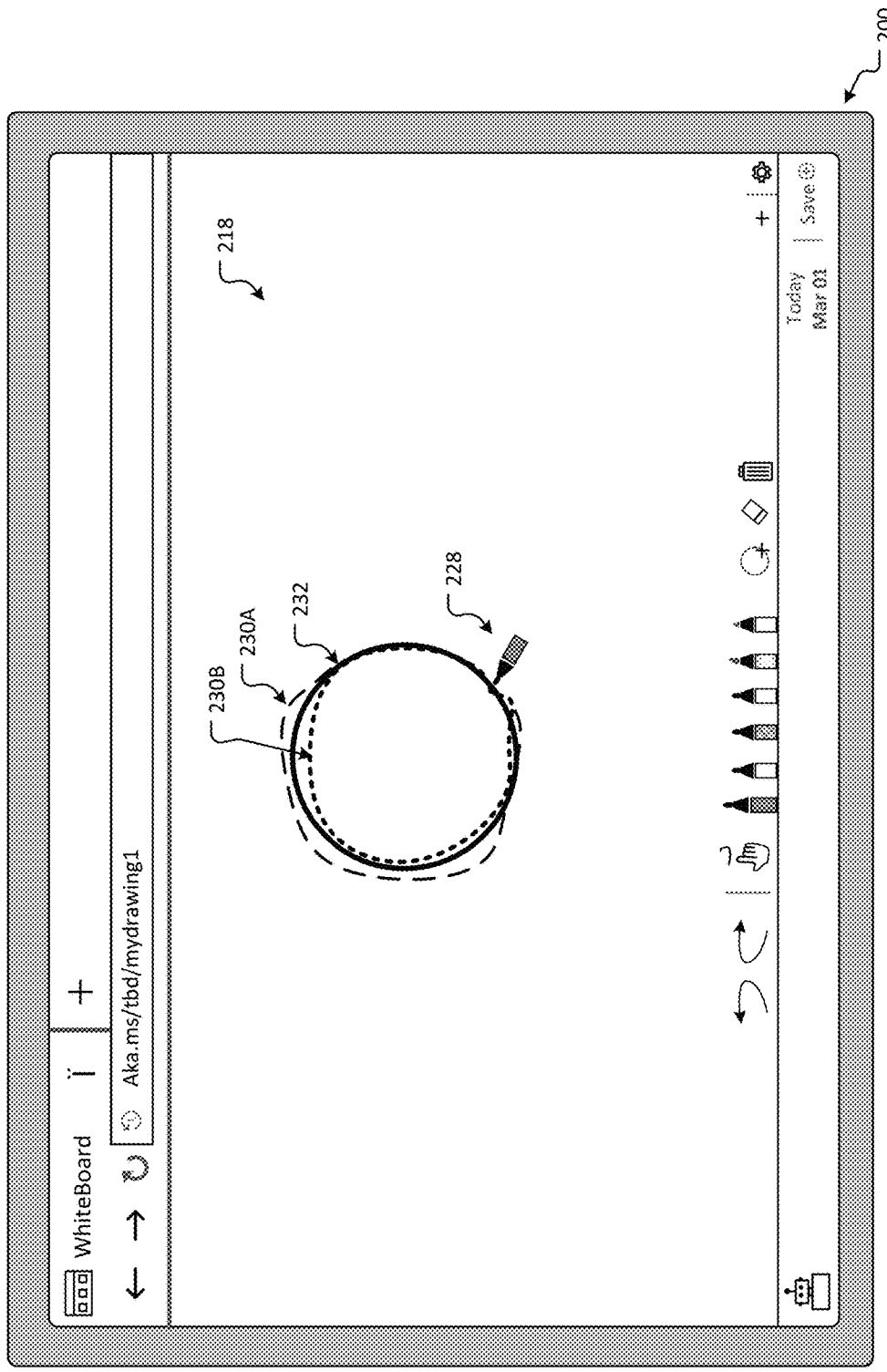

FIG. 2C depicts a third view of interface 200. In this case, it has been determined that the user intended to beautify a drawn shape represented by the first set of ink strokes 230A and the second set of ink strokes 230B. That is, based on determining that the user substantially retraced the first set of ink strokes 230A with the second set of ink strokes 230B, it was determined that the user intended to beautify the drawn shape. Additionally, a shape type corresponding to the drawn shape has been identified, e.g., by comparing the drawn shape to a plurality of different shape types or otherwise. In this case, it has been determined that the drawn shape is a circle shape type. Furthermore, a graphical circle 232 has been identified (e.g., from a store of graphical objects) and inserted on the drawing canvas 218. In further aspects, graphical circle 232 has been sized to approximate a size of the drawn shape represented by the first and second sets of ink strokes, e.g., by determining coordinates of the drawn shape based on average values of coordinates of the first set of ink strokes 230A and the second set of ink strokes 230B. For purposes of illustration, graphical circle 232 is represented by a solid line, the first set of ink strokes is represented by a dashed line, and the second set of ink strokes is represented by a dotted line. However, lines representing the various ink strokes and shapes may or may not be distinguishable.

In aspects, a user intent to beautify a drawn shape may be determined by a variety of methods, as described above. For example, the user intent may be determined when at least two sets of ink strokes substantially overlap each other. In aspects, a predetermined threshold may be specified to indicate a maximum number of pixels between at least two sets of ink strokes. When the distance between the sets of ink strokes is less than the predetermined threshold, a user intent to beautify the at least two sets of ink strokes may be determined. Additionally or alternatively, a percentage of overlap among the received sets of ink strokes may be compared to a threshold. When the percentage exceeds the threshold, a user intent to beautify the at least two sets of ink strokes may be determined.

Figure 2D:
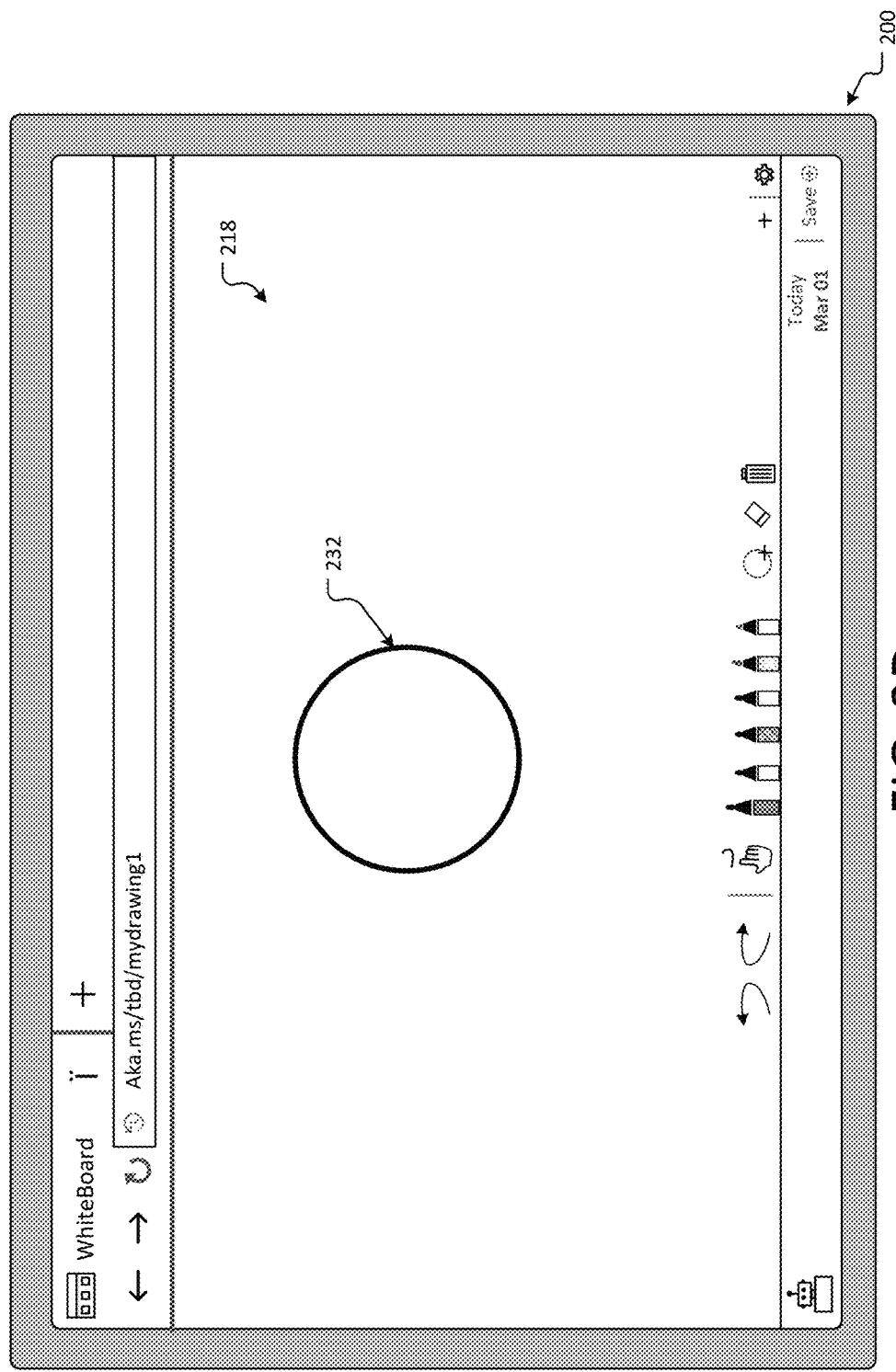

FIG. 2D depicts a fourth view in which the beautified graphical circle 232 has replaced the first set of ink strokes 230A and the second set of ink strokes 230B. As described above, in response to determining a user intent to beautify two or more sets of ink strokes, a shape type may be identified that corresponds to a drawn shape represented by the two or more sets of ink strokes. In some cases, a graphical object corresponding to the shape type may automatically replace the at least two sets of ink strokes.

As should be appreciated, the various methods, devices, components, etc., described with respect to FIGS. 2A-2D are not intended to limit the systems and methods to the particular components described. Accordingly, additional topology configurations may be used to practice the methods and systems herein and/or some components described may be excluded without departing from the methods and systems disclosed herein.

Figure 3A:
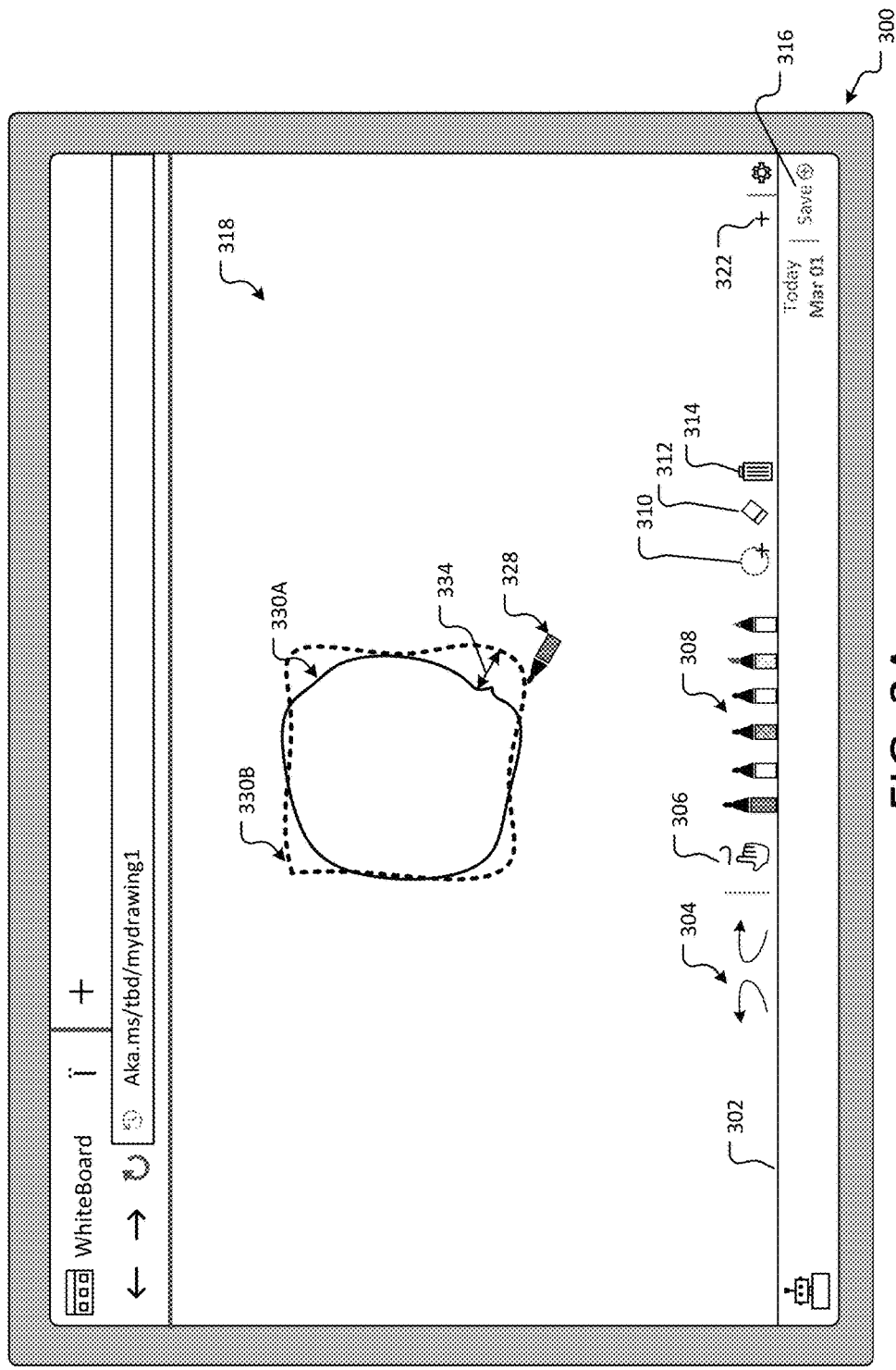
FIGS. 3A through 3C depict a graphical user interface for automatically converting ink strokes to graphical objects, according to an example embodiment.
Figure 3B:
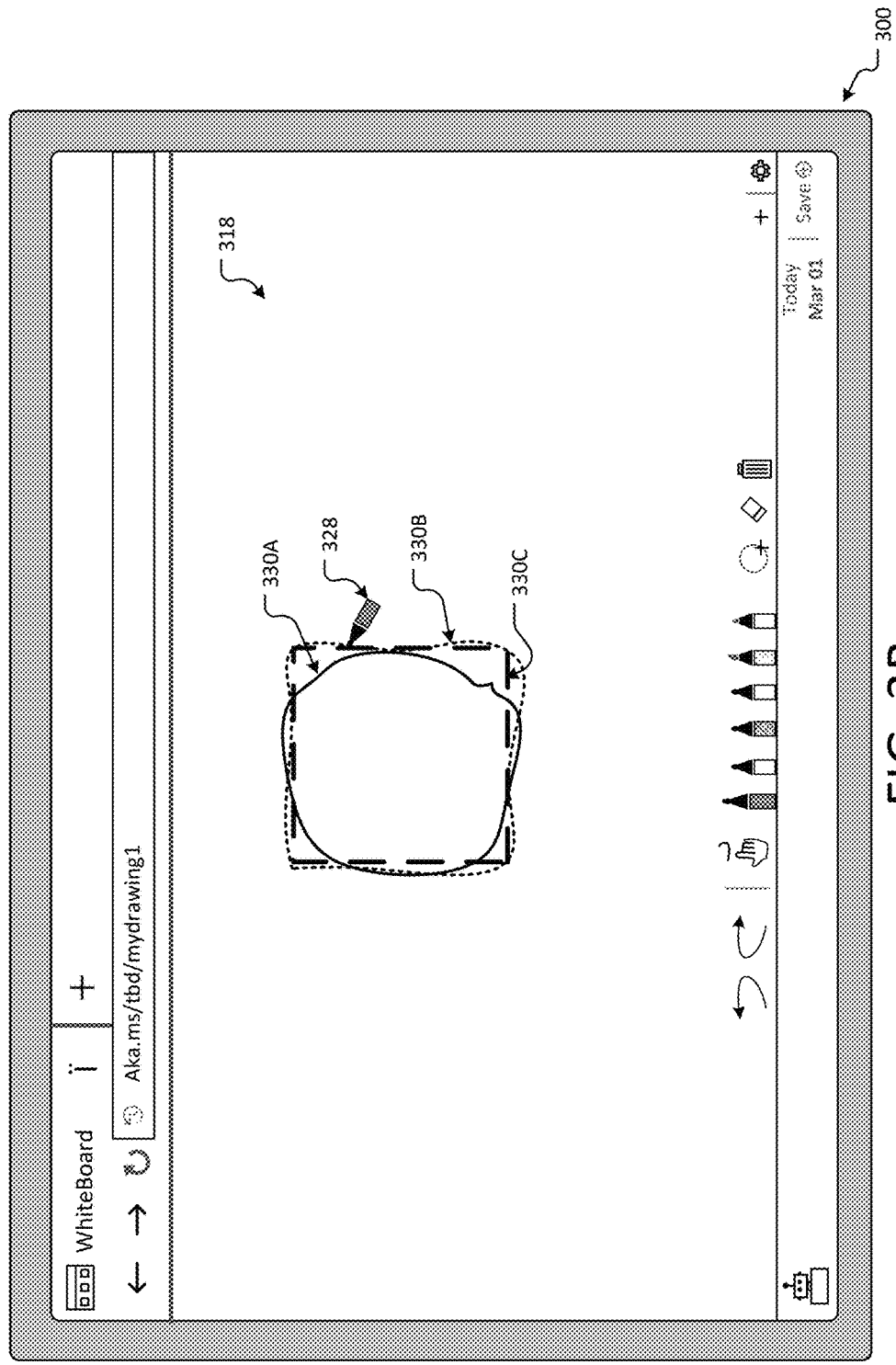
Figure 3C:
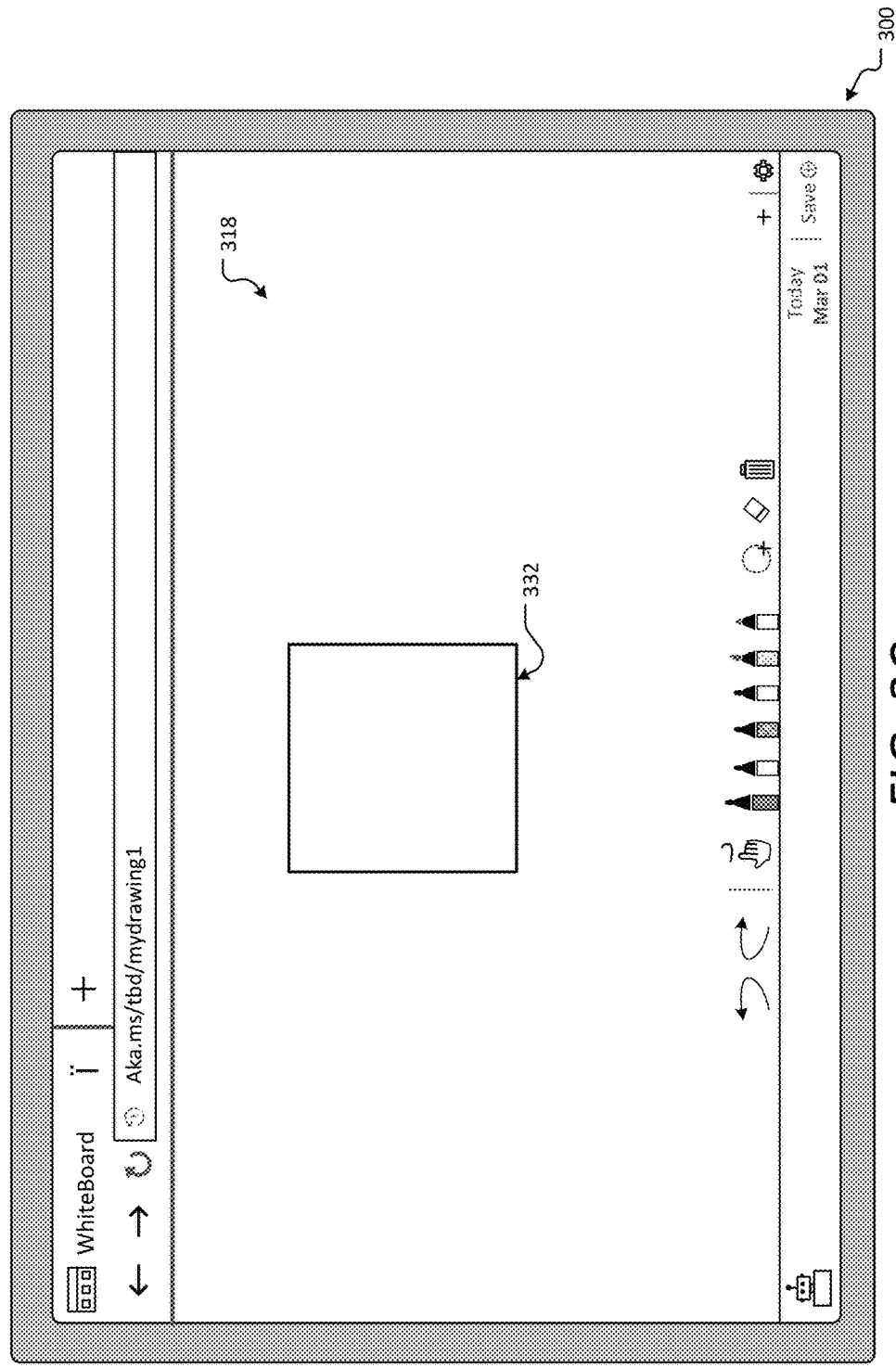

FIGS. 3A through 3C depict a graphical user interface for automatically converting ink strokes into graphical objects, according to an example embodiment. In particular, FIGS. 3A-3C depict different views of a graphical user interface 300 displaying multiple sets of ink strokes according to an example embodiment.

Similar to FIG. 2A, FIG. 3A illustrates a first view of an interface 300 of an electronic whiteboard, as described above. Interface 300 includes drawing canvas 318 and a toolbar 302. As with drawing canvas 218, drawing canvas 318 may be configured to receive various types of input, e.g., touch input, mouse input, keyboard input, stylus input, etc. Input onto the drawing canvas 318 may result in one or more ink strokes being displayed on the electronic whiteboard interface 300. Similar to toolbar 202, toolbar 302 may include a number of controls for interacting with the electronic whiteboard interface. For example, toolbar 302 may include undo/redo controls 304, touch control 306, pen gallery 308, lasso control 310, eraser control 312 and trash control 314. Toolbar 302 may also include insert control 322 and save control 316.

Additionally, FIG. 3A displays a first set of ink strokes 330A and a second set of ink strokes 330B on drawing canvas 318. As illustrated, the first set of ink strokes 330A is displayed with a solid line and the second set of ink strokes 330B is displayed with a dotted line. Additionally, a pen indicator 328 (or a cursor) is displayed at or near the second set of ink strokes 330B. For example, a virtual pen (or brush) may be selected from pen gallery 308 and used to input the first set of ink strokes 330A and the second set of ink strokes 330B. In this case, a cursor position for the virtual pen is indicated by pen indicator 328.

As detailed above, in some cases, a user may draw the second set of ink strokes 330B such that it substantially retraces the first set of ink strokes 330A. However, in the illustrated case, the second set of ink strokes 330B does not substantially retrace the first set of ink strokes 330A. Rather, the system has determined at least one distance 334 between the first set of ink strokes 330A and the second set of ink strokes 330B is substantially greater than distance 234 of FIG. 2B. Additionally, the degree of overlap between the first set of ink strokes 330A and the second set of ink strokes 330B is substantially less. Rather, the second set of ink strokes 330B intersects (or overlaps) with the first set of ink strokes 330A at very few points. Indeed, it appears that the first set of ink strokes 330A depicts a circle-like shape, whereas the second set of ink strokes depicts a square-like shape. In this case, it may be determined that the user's intent is not to beautify a drawn shape represented by the first set of ink strokes 330A and the second set of ink strokes 330B. In fact, the first set of ink strokes 330A and the second set of ink strokes 330B are not readily combined to represent a single type of shape. Accordingly, the system may determine not to replace the first and second sets of ink strokes with a graphical object.

FIG. 3B depicts a second view of interface 300 in which a third set of ink strokes 330C has been received on drawing canvas 318. As illustrated, the first set of ink strokes 330A is displayed with a solid line, the second set of ink strokes 330B is displayed with a dotted line and the third set of ink strokes 330C is displayed with a dashed line. In this case, the third set of ink strokes 330C substantially retraces the second set of ink strokes 330B but not the first set of ink strokes 330A. In this way, the user may express an intention to draw a more uniform or beautified shape associated with the second set of ink strokes 330B and third set of ink strokes 330C. As described above, the system may determine that the third set of ink strokes 330C substantially retraces the second set of ink strokes 330B via any suitable means, e.g., by determining a distance between the second and third sets of ink strokes, by determining a degree to which the second and third sets of ink strokes overlap, or otherwise. Similarly, the system may determine that the third set of ink strokes 330C does not substantially retrace the first set of ink strokes 330A via any suitable means, as described above.

Based on determining that the user substantially retraced the second set of ink strokes 330B with the third set of ink strokes 330C, it may be determined that the user intended to beautify the drawn shape represented by the second and third ink strokes. Additionally, a shape type corresponding to the drawn shape may be identified, e.g., by comparing the drawn shape to a plurality of different shape types or otherwise. In this case, it may be determined that the drawn shape is a square shape type.

FIG. 3C depicts a third view of interface 300 in which a graphical square 332 has replaced the first set of ink strokes 330A, the second set of ink strokes 330B, and the third set of ink strokes 330C on drawing canvas 318. As described above, in response to determining a user intent to beautify two or more sets of ink strokes, a shape type may be identified that corresponds to a drawn shape represented by the two or more sets of ink strokes. In this case, although the first set of ink strokes 330A depicted a circle-like shape, both the second and third sets of ink strokes depicted a square-like shape. In some aspects, subsequent sets of ink strokes may have precedence and may "overwrite" an earlier set of ink strokes. That is, it may be inferred that as the second and third sets of ink strokes were later in time than the first set of ink strokes, the user intended to change the circle-like shape to a square-like shape. As described above, graphical square 332 has been sized to approximate a size of the drawn shape represented by the second and third sets of ink strokes, e.g., by determining coordinates of the drawn shape based on average values of coordinates of the second set of ink strokes 330B and the third set of ink strokes 330C.

As should be appreciated, the various methods, devices, components, etc., described with respect to FIGS. 3A-3C are not intended to limit the systems and methods to the particular components described. Accordingly, additional topology configurations may be used to practice the methods and systems herein and/or some components described may be excluded without departing from the methods and systems disclosed herein.

FIGS. 4A through 4E depict a graphical user interface for automatically converting ink strokes into graphical objects, according to an example embodiment. In particular, FIGS. 4A-4E depict different views of a graphical user interface 400 displaying multiple sets of ink strokes according to an example embodiment.

Figure 4A:
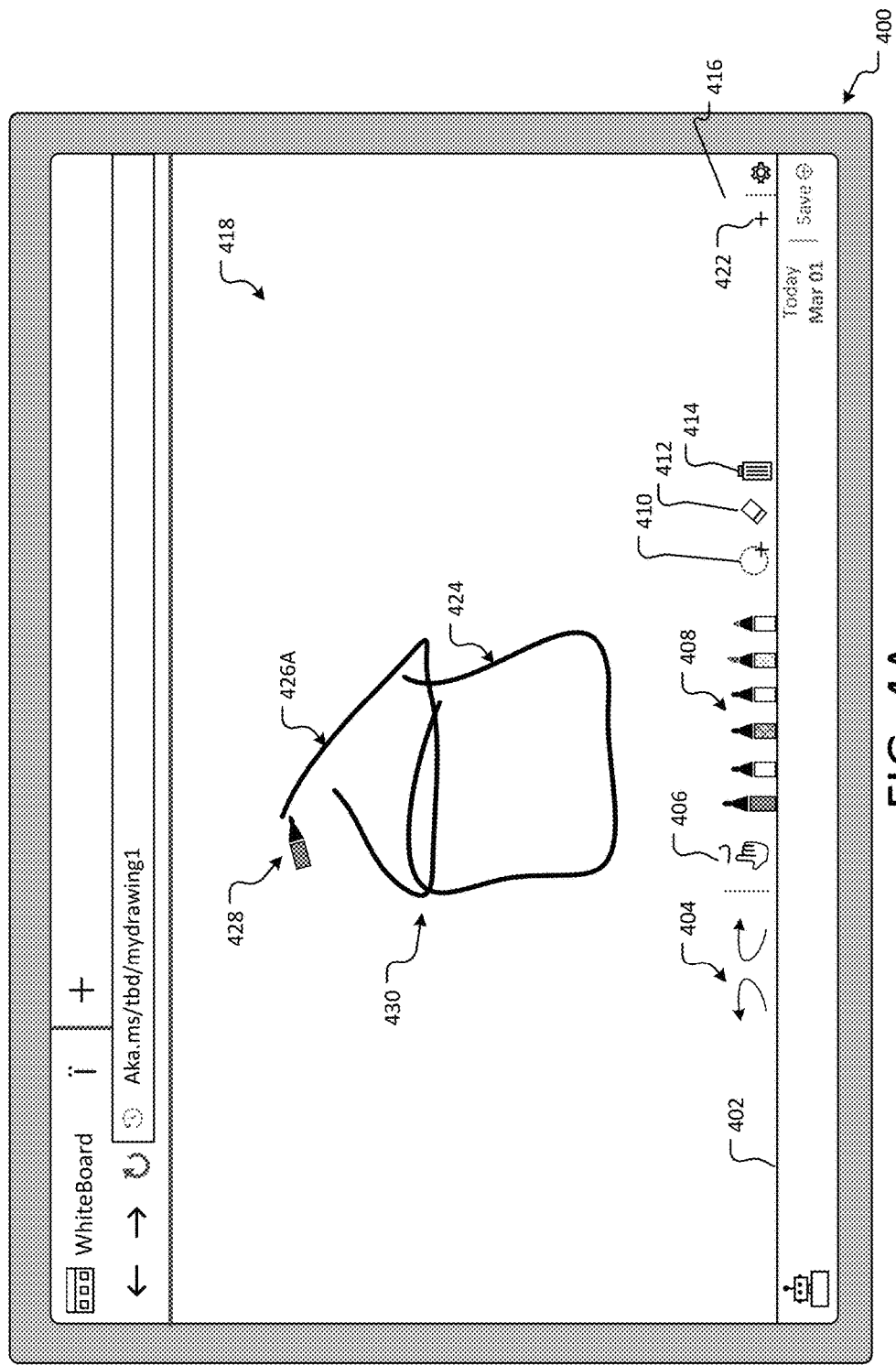
FIGS. 4A through 4E depict a graphical user interface for automatically converting ink strokes to graphical objects, according to an example embodiment.

Similar to FIG. 2A, FIG. 4A illustrates a first view of an interface 400 of an electronic whiteboard, as described above. Interface 400 includes drawing canvas 418 and a toolbar 402. Drawing canvas 418 may be configured to receive various types of input, e.g., touch input, mouse input, keyboard input, stylus input, etc. Input onto the drawing canvas 418 may result in one or more ink strokes being displayed on the electronic whiteboard interface 400. Toolbar 402 may include a number of controls for interacting with the electronic whiteboard interface, including undo/redo controls 404, touch control 406, pen gallery 408, lasso control 410, eraser control 412 and trash control 414. Toolbar 402 may also include insert control 422 and save control 416.

FIG. 4A further displays a first set of ink strokes 424 and a second set of ink strokes 426A on drawing canvas 418. In this case, the first set of ink strokes 424 depicts a square-like shape and the second set of ink strokes 426A depicts a triangle-like shape. A pen indicator 428 is displayed at or near the second set of ink strokes 426A. For example, a virtual pen (or brush) may be selected from pen gallery 408 and used to input the first set of ink strokes 424 and the second set of ink strokes 426A. In this case, a cursor position for the virtual pen is indicated by pen indicator 428. As shown, the second set of ink strokes 426A overlaps the first set of ink strokes 424 along adjacent region 430.

Figure 4B:
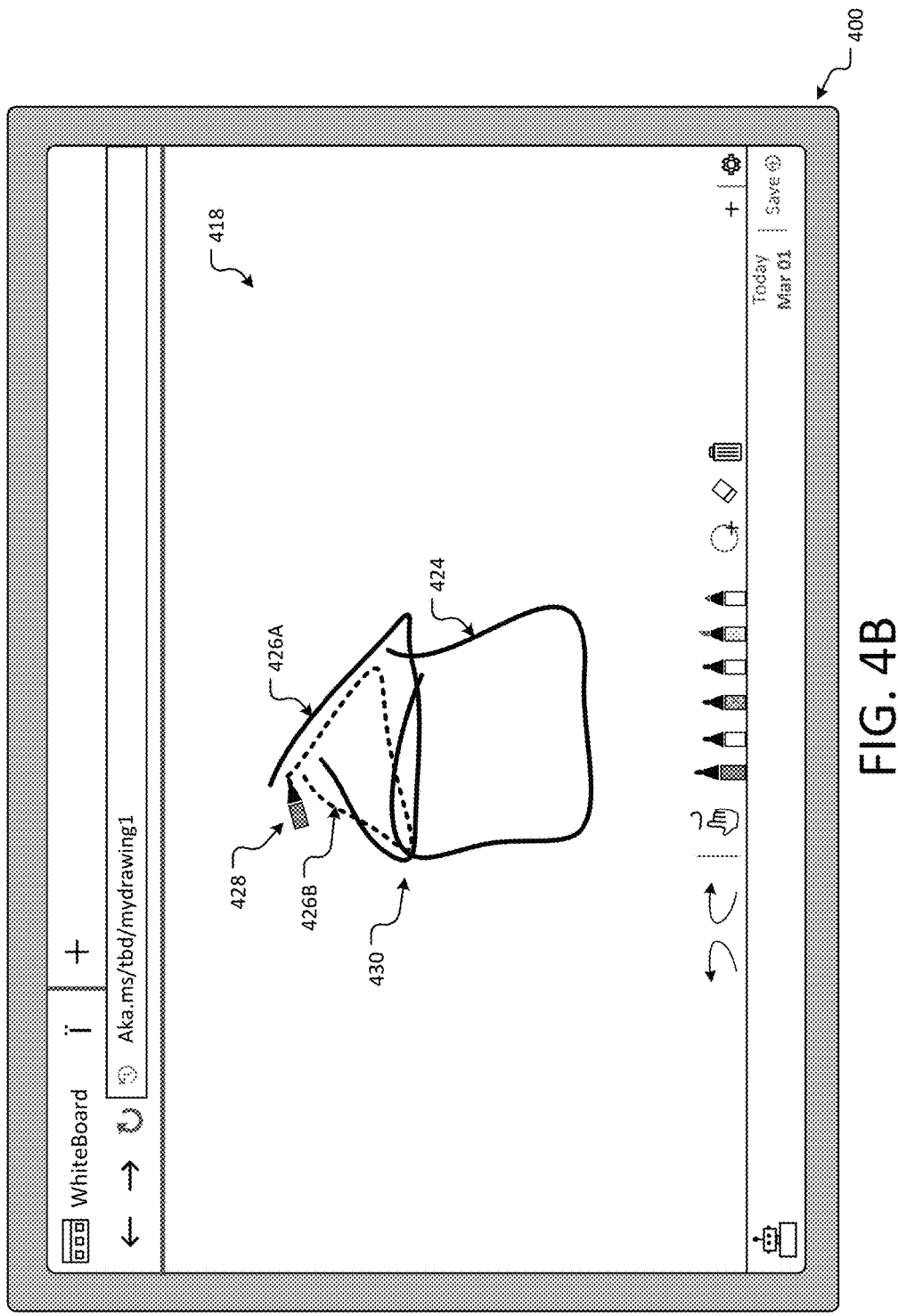

FIG. 4B depicts a second view of interface 400 in which a third set of ink strokes 426B has been received on drawing canvas 418. As illustrated, the first set of ink strokes 424 and the second set of ink strokes 426A are displayed with a solid line, while the third set of ink strokes 426B is displayed with a dotted line. In this case, the third set of ink strokes 426B substantially retraces the second set of ink strokes 426A but not the first set of ink strokes 424. Rather, as with the second set of ink strokes 426A, the third set of ink strokes 426B overlaps the first set of ink strokes 424 only along adjacent region 430. In this way, the user may express an intention to draw a more uniform or beautified shape associated with the second set of ink strokes 426A and third set of ink strokes 426B but not necessarily the first set of ink strokes 424. As described above, the system may determine that the third set of ink strokes 426B substantially retraces the second set of ink strokes 426A via any suitable means, e.g., by determining a distance between the second and third sets of ink strokes, by determining a degree to which the second and third sets of ink strokes overlap, or otherwise. Similarly, the system may determine that the third set of ink strokes 426B does not substantially retrace the first set of ink strokes 424 via any suitable means, as described above.

Based on determining that the user substantially retraced the second set of ink strokes 426A with the third set of ink strokes 426B, it may be determined that the user intended to beautify the drawn shape represented by the second and third ink strokes. Additionally, a shape type corresponding to the drawn shape may be identified, e.g., by comparing the drawn shape to a plurality of different shape types or otherwise. In this case, it may be determined that the drawn shape is a triangle shape type.

Figure 4C:
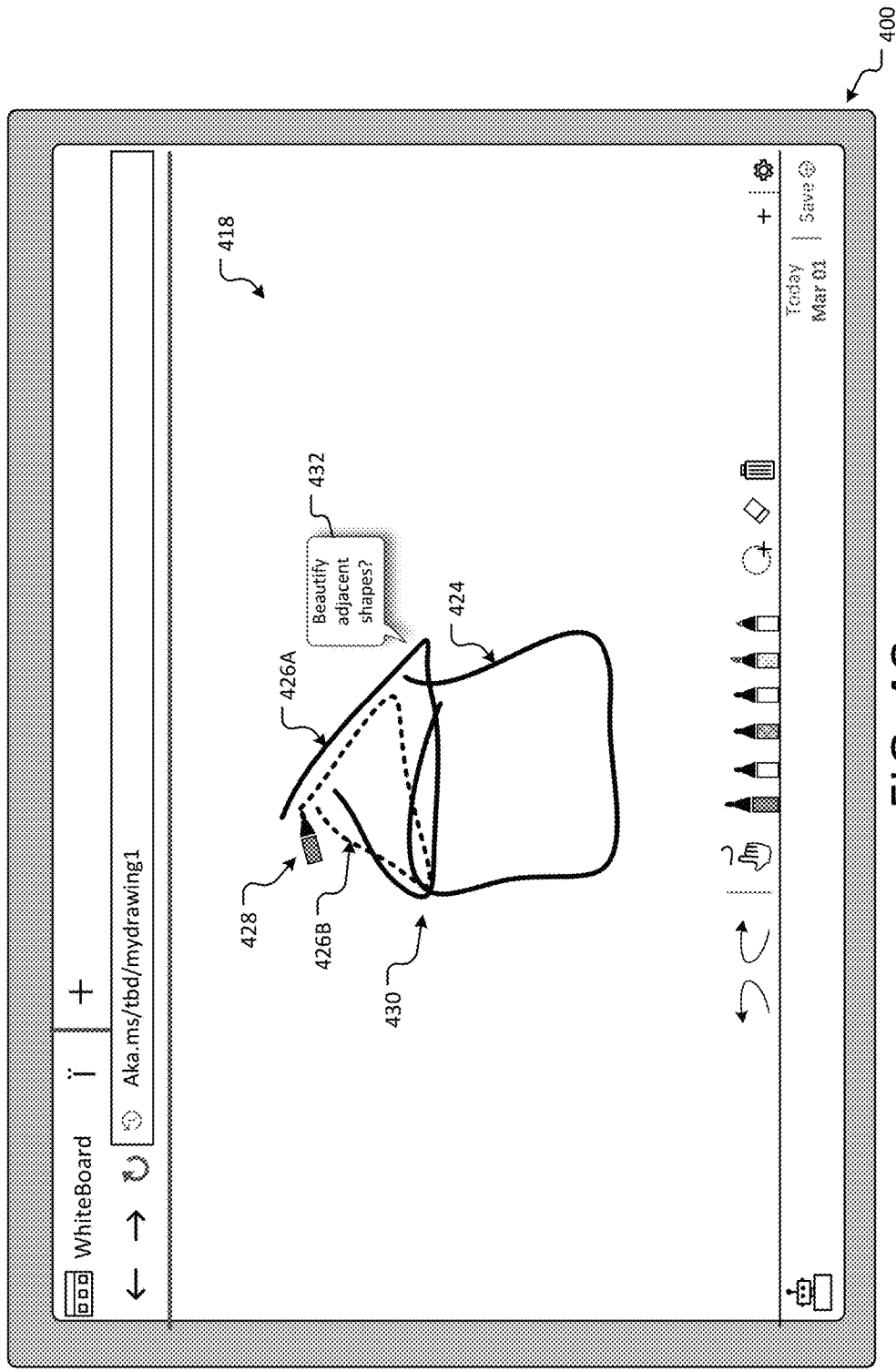

FIG. 4C depicts a third view of interface 400. In this case, the system determined that the user intended to beautify the triangle-like shape represented by the second set of ink strokes 426A and the third set of ink strokes 426B. However, the system may further determine that the second and third sets of ink strokes overlap the first set of ink strokes 424 along adjacent region 430. In some cases, where drawn shapes overlap, a user may wish to beautify the composite drawing rather than a single drawn shape within the composite drawing. Drawn shapes associated with a composite drawing may be determined by any suitable means, e.g., by detecting at least a partial overlap between a drawn shape and at least one other drawn shape, by detecting drawn shapes falling within a threshold distance of at least one other drawn shape, etc. In this case, when the system determines that the user intends to beautify one drawn shape that is adjacent to and/or partially overlapping another drawn shape, the system may provide a prompt 432. Prompt 432 may offer an option to beautify multiple shapes within a composite drawing when it is determined that the user intends to beautify at least one drawn shape within the composite drawing.

Figure 4D:
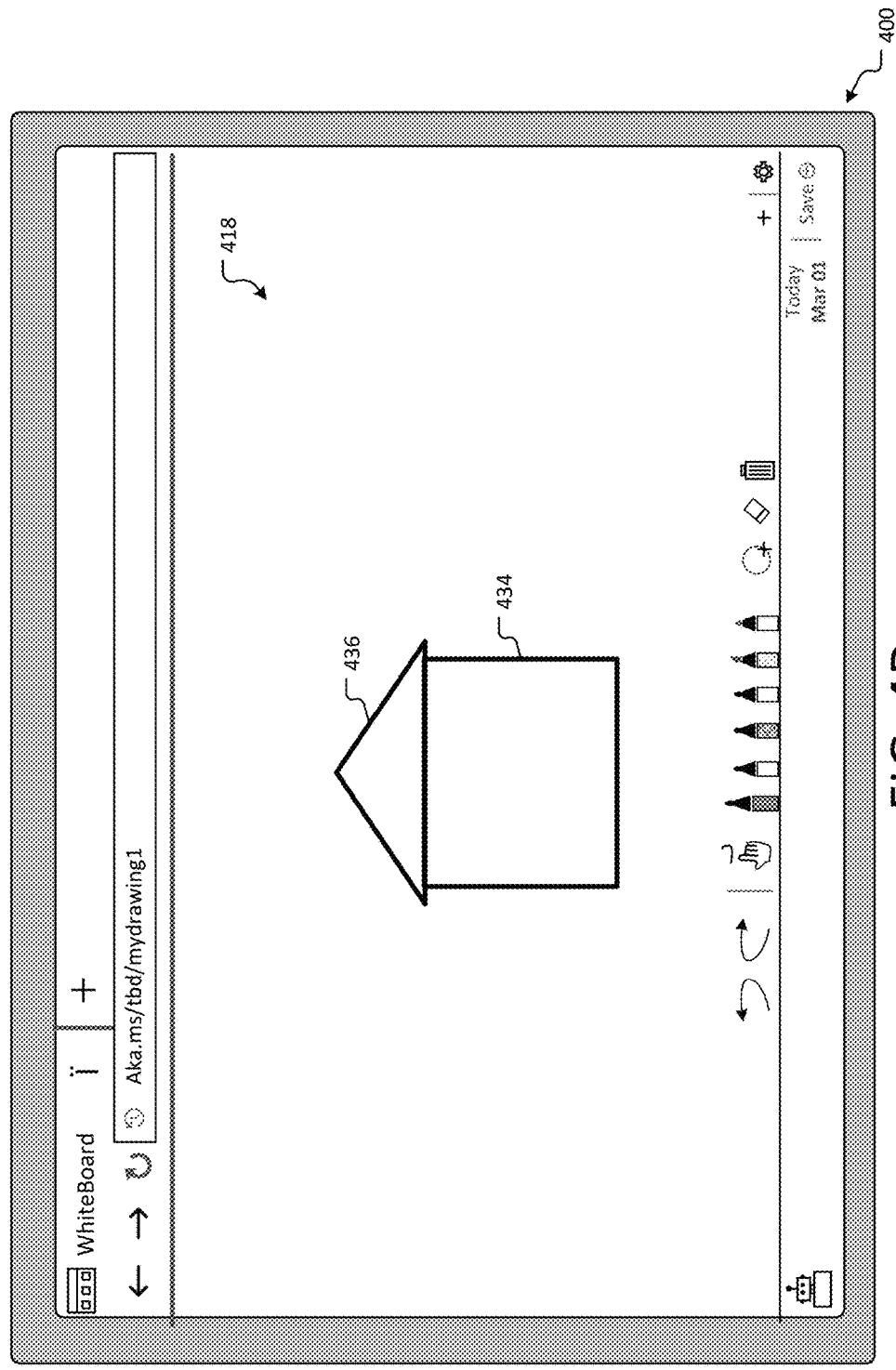

FIG. 4D depicts a fourth view of interface 400 in which the user has responded affirmatively to prompt 432 of FIG. 4C. In this case, a graphical square 434 replaces the first set of ink strokes 424, and a graphical triangle 436 replaces the second set of ink strokes 426A and the third set of ink strokes 426B, on drawing canvas 418. As described above, in response to determining a user intent to beautify two or more sets of ink strokes, a shape type may be identified that corresponds to a drawn shape represented by the two or more sets of ink strokes. In this case, the second and third sets of ink strokes depicted a triangle-like shape corresponding to a triangle shape type. Further, graphical triangle 436 of the triangle shape type has been selected (e.g., automatically) and replaces the second set of ink strokes 426A and the third set of ink strokes 426B.

Additionally, as the user responded affirmatively to beautifying the composite drawing represented by the first, second and third sets of ink strokes, a shape type may be determined that corresponds to the drawn shape represented by the first set of ink strokes. In this case, the first set of ink strokes depicted a square-like shape corresponding to a square shape type. Further, graphical square 434 of the square shape type has been selected (e.g., automatically) and replaces the first set of ink strokes 424. As described above, graphical square 434 and graphical triangle 436 have been sized to approximate a size of the drawn shapes represented by the first, second and third sets of ink strokes.

Figure 4E:
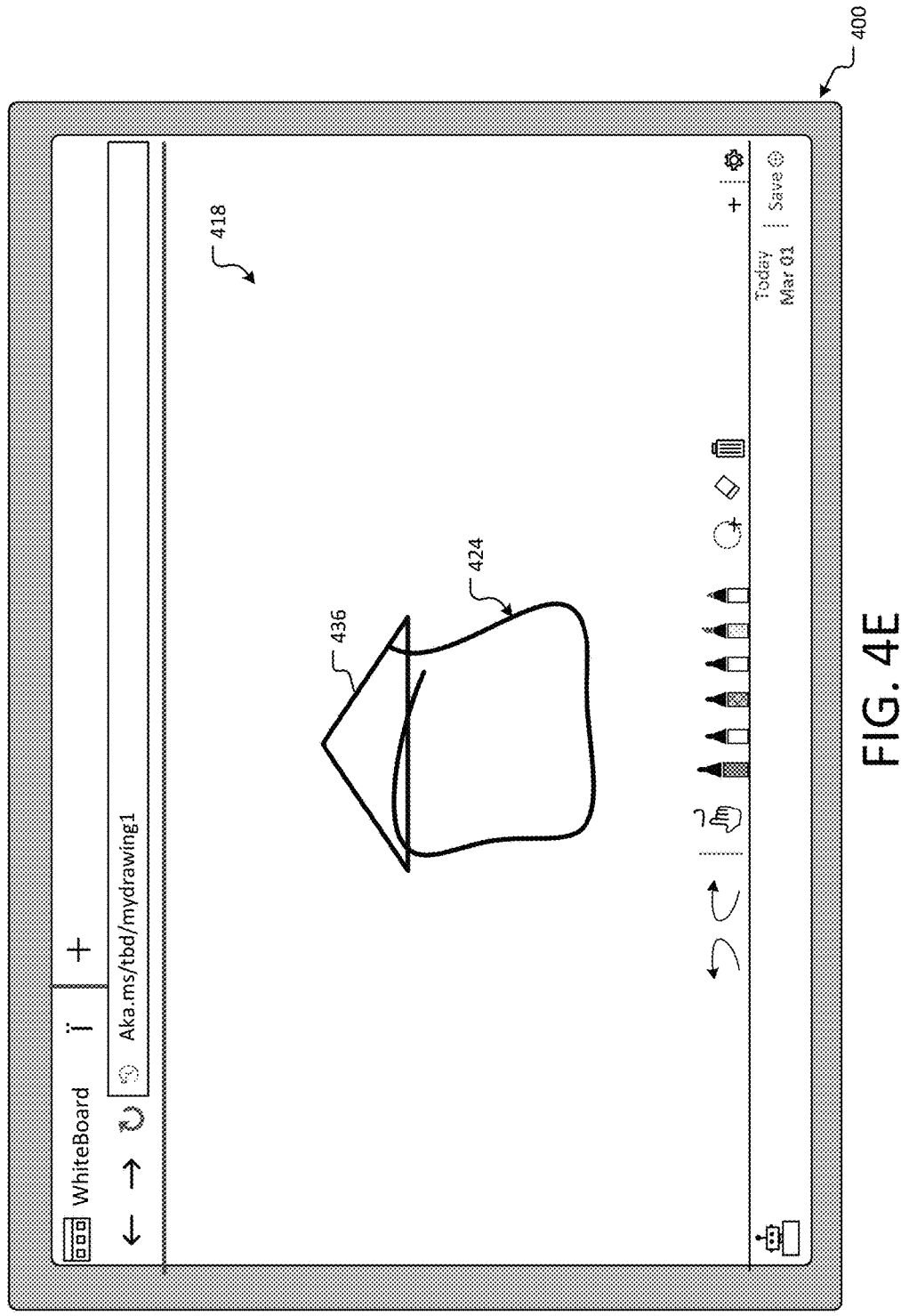

FIG. 4E depicts a fifth view of interface 400 in which the user has responded negatively to prompt 432 of FIG. 4C. In this case, a graphical triangle 436 replaces the second set of ink strokes 426A and the third set of ink strokes 426B on drawing canvas 418. However, the first set of ink strokes 424 remains unchanged. As described above, in response to determining a user intent to beautify two or more sets of ink strokes, a shape type may be identified that corresponds to a drawn shape represented by the two or more sets of ink strokes. In this case, the second and third sets of ink strokes depicted a triangle-like shape corresponding to a triangle shape type. Further, graphical triangle 436 of the triangle shape type has been selected (e.g., automatically) and replaces the second set of ink strokes 426A and the third set of ink strokes 426B. As described above, graphical triangle 436 has been sized to approximate a size of the drawn shape represented by the second and third sets of ink strokes.

As should be appreciated, the various methods, devices, components, etc., described with respect to FIGS. 4A through 4E are not intended to limit the systems and methods to the particular components described. Accordingly, additional topology configurations may be used to practice the methods and systems herein and/or some components described may be excluded without departing from the methods and systems disclosed herein.

FIGS. 5A through 5E depict a graphical user interface for automatically converting ink strokes into graphical objects, according to an example embodiment. In particular, FIGS. 5A-5E depict different views of a graphical user interface 500 displaying multiple sets of ink strokes according to an example embodiment.

Figure 5A:
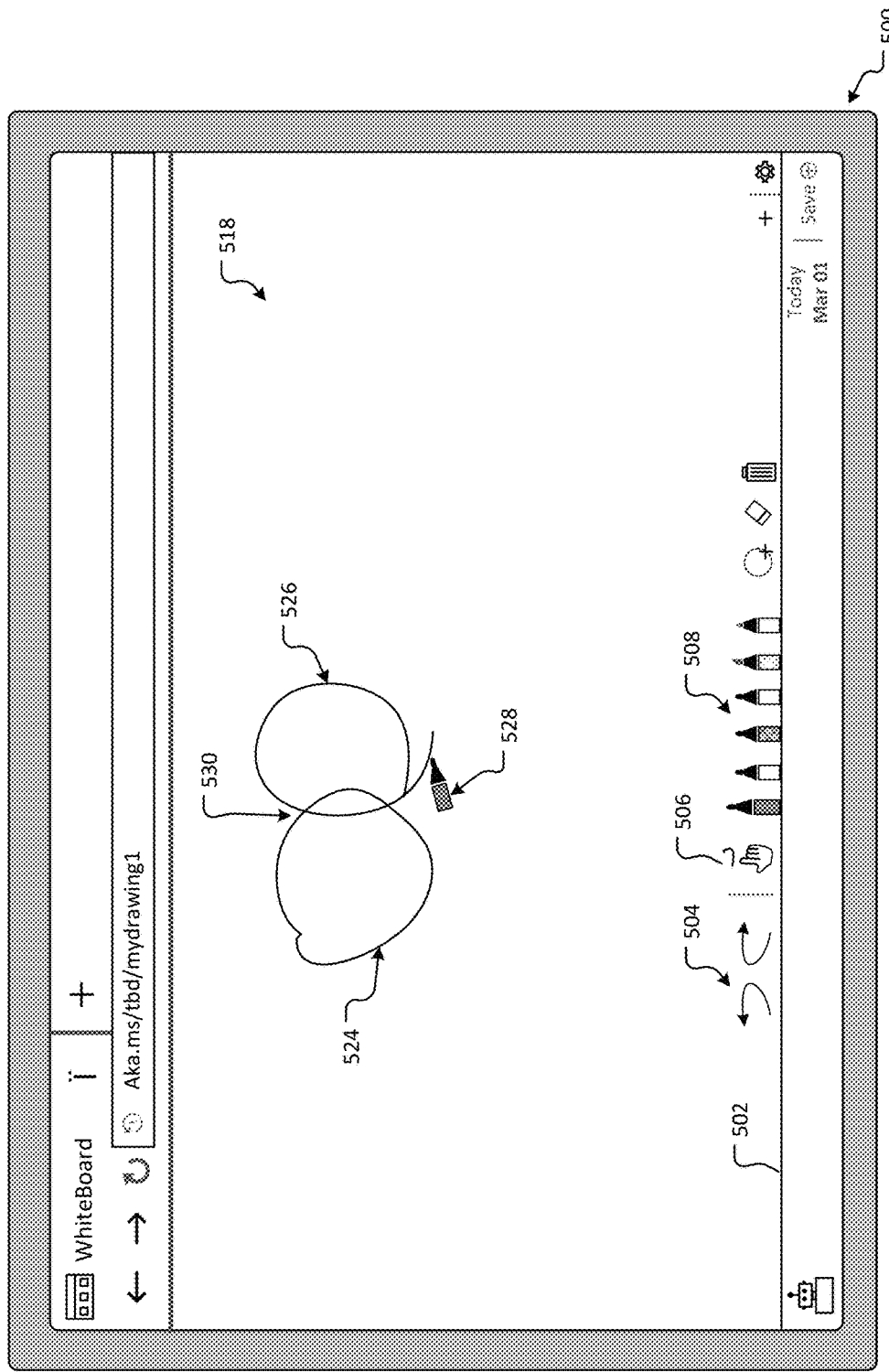

Similar to FIG. 2A, FIG. 5A illustrates a first view of an interface 500 of an electronic whiteboard, as described above. Interface 500 includes drawing canvas 518 and a toolbar 502. Drawing canvas 518 may be configured to receive various types of input, e.g., touch input, mouse input, keyboard input, stylus input, etc. Input onto the drawing canvas 518 may result in one or more ink strokes being displayed on the electronic whiteboard interface 500. Toolbar 502 may include a number of controls for interacting with the electronic whiteboard interface, including undo/redo controls 504, touch control 506, pen gallery 508, etc.

FIG. 5A further displays a first set of ink strokes 524 and a second set of ink strokes 526 on drawing canvas 518. In this case, the first set of ink strokes 524 depicts a circle-like shape and the second set of ink strokes 526 depicts a circle-like shape. Pen indicator 528 is displayed at or near the second set of ink strokes 526. For example, a virtual pen (or brush) may be selected from pen gallery 508 and used to input the first set of ink strokes 524 and the second set of ink strokes 526. In this case, a cursor position for the virtual pen is indicated by pen indicator 528.

As shown, the second set of ink strokes 526 overlaps the first set of ink strokes 524 along adjacent region 530. However, in this case, although both the first set of ink strokes 524 and the second set of ink strokes 526 depict circle-like shapes, it may be determined that the first set of ink strokes 524 and the second set of ink strokes 526 do not substantially overlap. For instance, it may be determined that the first set of ink strokes 524 and the second set of ink strokes 526 overlap by less than a threshold (e.g., 50% or less). Accordingly, it may be determined that the user did not substantially retrace the first set of ink strokes 524 with the second set of ink strokes 526. It may be further determined that the user did not intend to beautify a drawn shape depicted by either the first set of ink strokes 524 or the second set of ink strokes 526.

FIG. 5B depicts a second view of interface 500 in which a third set of ink strokes 532, a fourth set of ink strokes 534, a fifth set of ink strokes 536A and a sixth set of ink strokes 536B have been received on drawing canvas 518. Pen indicator 528 is displayed at or near the sixth set of ink strokes 536B. As illustrated, while the first set of ink strokes 524, the second set of ink strokes 526, the third set of ink strokes 532, the fourth set of ink strokes 534, and the fifth set of ink strokes 536A have overlapping regions (e.g., adjacent regions 530A, 530B, 530C), these sets of ink strokes may be determined not to substantially overlap (as described above). However, the sixth set of ink strokes 536B substantially overlaps the fifth set of ink strokes 536A. In this way, the user may express an intention to draw a more uniform or beautified shape associated with the sixth set of ink strokes 536B and the fifth set of ink strokes 536A. As described above, the system may determine that the sixth set of ink strokes 536B substantially retraces the fifth set of ink strokes 536A via any suitable means, e.g., by determining a distance between the fifth and sixth sets of ink strokes, by determining a degree to which the fifth and sixth sets of ink strokes overlap, or otherwise. Similarly, the system may determine that the sixth set of ink strokes 536B does not substantially retrace the first, second, third and fourth sets of ink strokes via any suitable means, as described above.

Based on determining that the user substantially retraced the fifth set of ink strokes 536A with the sixth set of ink strokes 536B, it may be determined that the user intended to beautify the drawn shape represented by the fifth and sixth ink strokes. Additionally, a shape type corresponding to the drawn shape may be identified, e.g., by comparing the drawn shape to a plurality of different shape types or otherwise. In this case, it may be determined that the drawn shape is a circle shape type.

Figure 5C:
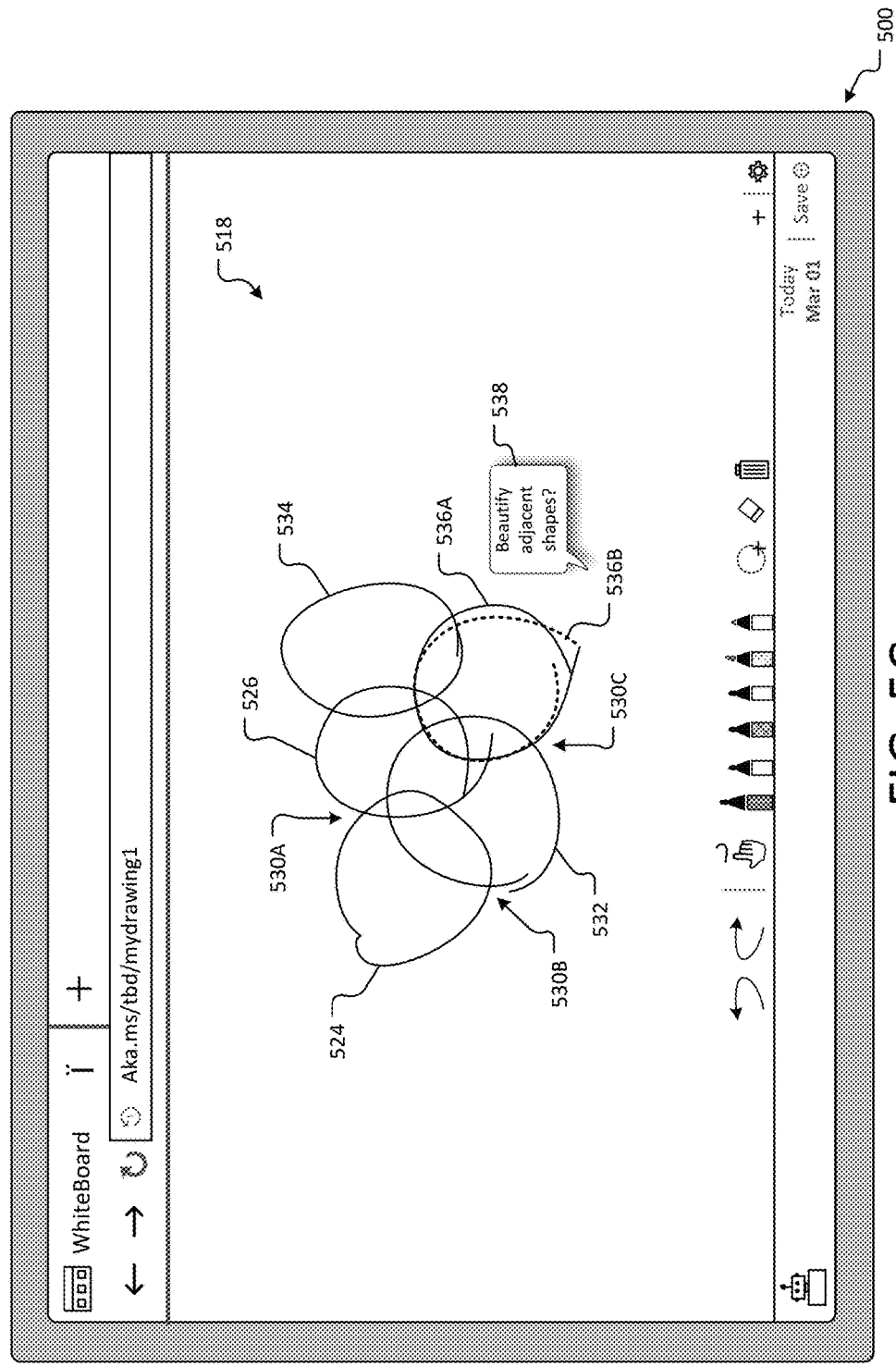

FIG. 5C depicts a third view of interface 500. In this case, the system determined that the user intended to beautify the circle-like shape represented by the fifth set of ink strokes 536A and the sixth set of ink strokes 536B. However, the system may further determine that the fifth and sixth sets of ink strokes overlap at least the third set of ink strokes 532 along adjacent region 530C. As described above, where drawn shapes overlap, a user may wish to beautify the whole composite drawing rather than a single drawn shape within the composite drawing. Drawn shapes associated with a composite drawing may be determined by any suitable means, e.g., by detecting at least a partial overlap between a drawn shape and at least one other drawn shape, by detecting drawn shapes falling within a threshold distance of at least one other drawn shape, etc. In this case, when the system determines that the user intends to beautify one drawn shape that is adjacent to and/or partially overlapping another drawn shape, the system may provide a prompt 538. Prompt 538 may offer an option to beautify multiple shapes within a composite drawing when it is determined that the user intends to beautify at least one drawn shape within the composite drawing.

Figure 5D:
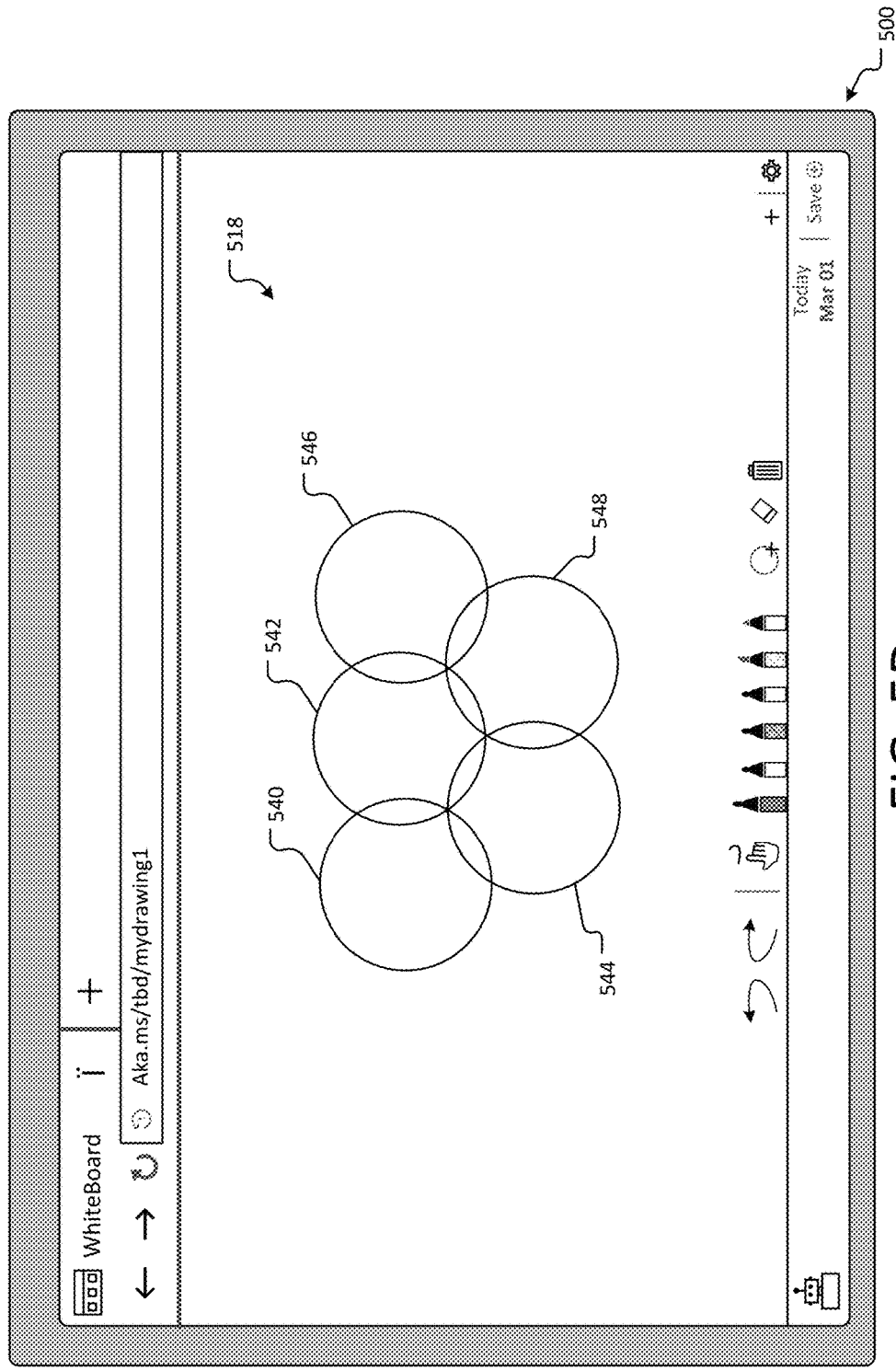

FIG. 5D depicts a fourth view of interface 500 in which the user has responded affirmatively to prompt 538 of FIG. 5C. In this case, a first graphical circle 540 replaces the first set of ink strokes 524, a second graphical circle 542 replaces the second set of ink strokes 526, a third graphical circle 544 replaces the third set of ink strokes 532, a fourth graphical circle 546 replaces the fourth set of ink strokes 534, and a fifth graphical circle 548 replaces the fifth and sixth sets of ink strokes 536A, 536B on drawing canvas 518. As described above, in response to determining a user intent to beautify two or more sets of ink strokes, a shape type may be identified that corresponds to a drawn shape represented by the two or more sets of ink strokes. In this case, the fifth and sixth sets of ink strokes depicted a circle-like shape corresponding to a circle shape type. Further, graphical circle 548 of the circle shape type has been selected (e.g., automatically) and replaces the fifth and sixth sets of ink strokes 536A, 536B.

Additionally, as the user responded affirmatively to beautifying the composite drawing represented by the first through sixth sets of ink strokes, a shape type may be determined that corresponds to the drawn shapes represented by the first through fourth sets of ink strokes. In this case, the first through fourth sets of ink strokes also depict circle-like shapes corresponding to a circle shape type. In this case, graphical circles 540, 542, 544 and 546 of the circle shape type have been selected (e.g., automatically) and replace the first through fourth sets of ink strokes 524, 526, 532 and 534. As described above, graphical circles 540, 542, 544, 546 and 548 have been sized to approximate a size of the drawn shapes represented by the first through sixth sets of ink strokes 524, 526, 532, 534, 536A and 536B.

Figure 5E:
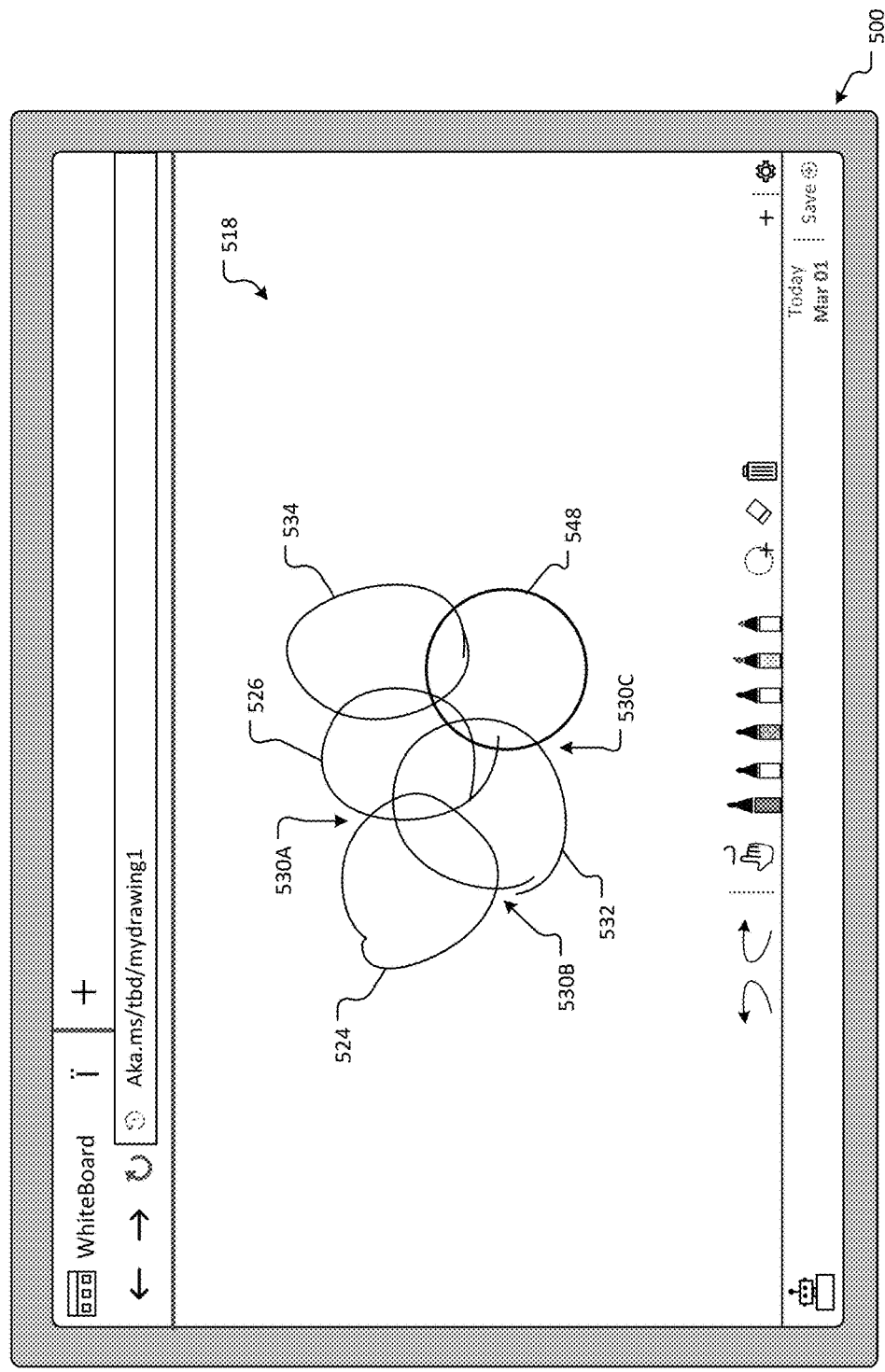

FIG. 5E depicts a fifth view of interface 500 in which the user has responded negatively to prompt 538 of FIG. 5C. In this case, a graphical circle 548 replaces the fifth set of ink strokes 536A and sixth set of ink strokes 536B on drawing canvas 518. However, the first through fourth sets of ink strokes 524, 526, 532 and 534 remain unchanged. As described above, in response to determining a user intent to beautify two or more sets of ink strokes, a shape type may be identified that corresponds to a drawn shape represented by the two or more sets of ink strokes. In this case, the fifth and sixth sets of ink strokes depicted a circle-like shape corresponding to a circle shape type. Further, graphical circle 548 of the circle shape type has been selected (e.g., automatically) and replaces the fifth set of ink strokes 536A and sixth set of ink strokes 536B. As described above, graphical circle 548 has been sized to approximate a size of the drawn shape represented by the fifth and sixth sets of ink strokes.

As should be appreciated, the various methods, devices, components, etc., described with respect to FIGS. 5A through 5E are not intended to limit the systems and methods to the particular components described. Accordingly, additional topology configurations may be used to practice the methods and systems herein and/or some components described may be excluded without departing from the methods and systems disclosed herein.

FIGS. 6A through 6E depict a graphical user interface for automatically converting ink strokes into graphical objects in a flowchart, according to an example embodiment.

Figure 6A:
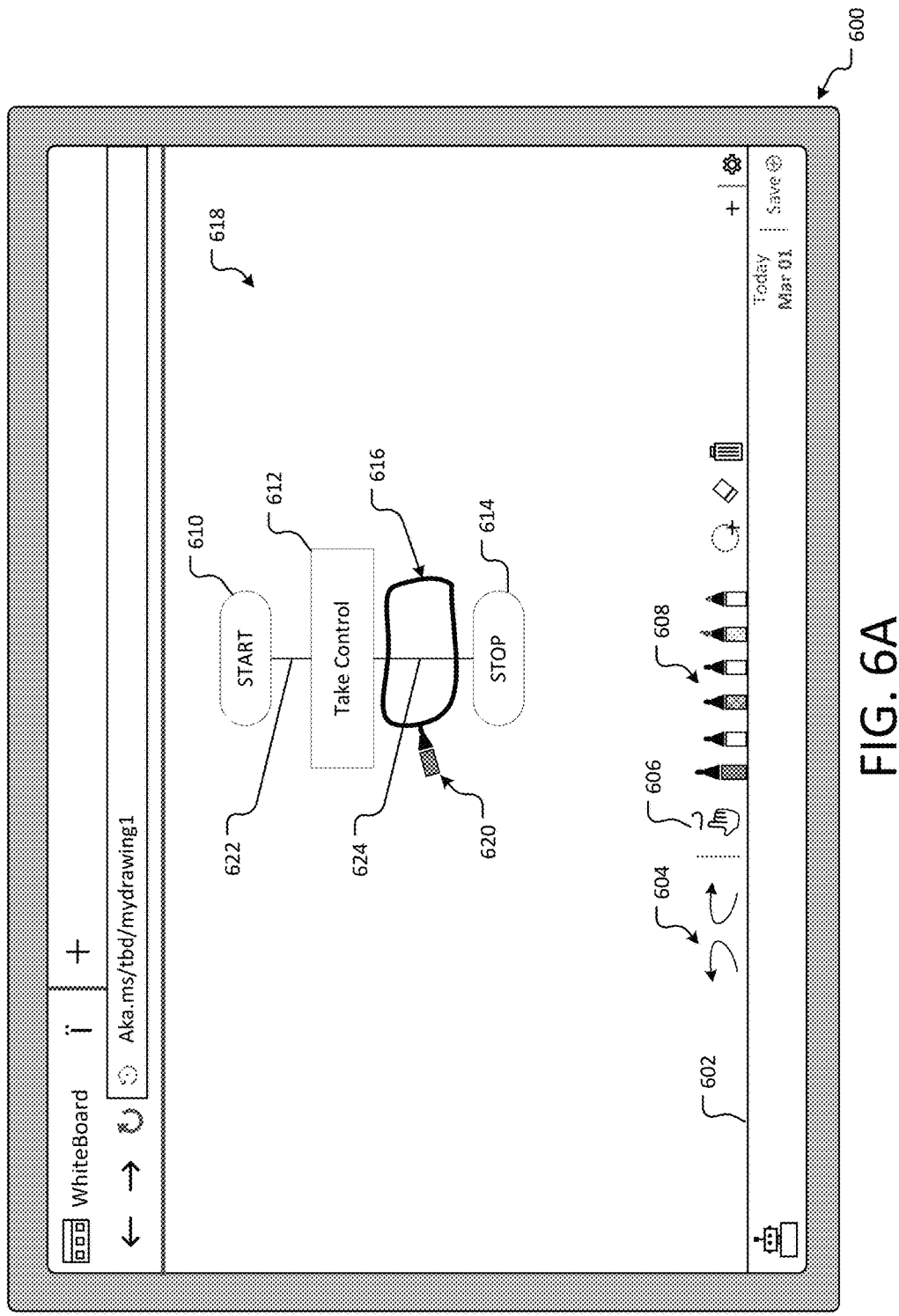
FIGS. 6A through 6E depict a graphical user interface for automatically converting ink strokes into graphical objects in a flowchart, according to an example embodiment.

Similar to FIG. 2A, FIG. 6A illustrates a first view of an interface 600 of an electronic whiteboard, as described above. Interface 600 includes drawing canvas 618 and a toolbar 602. Drawing canvas 618 may be configured to receive various types of input, e.g., touch input, mouse input, keyboard input, stylus input, etc. Input onto the drawing canvas 618 may result in one or more ink strokes being displayed on the electronic whiteboard interface 600. Toolbar 602 may include a number of controls for interacting with the electronic whiteboard interface, including undo/redo controls 604, touch control 606, pen gallery 608, etc.

FIG. 6A further displays a flowchart including a first graphical object 610, a second graphical object 612 and a third graphical object 614; and including a first transition 622 and a second transition 624. Additionally, a set of ink strokes 616 has been drawn over second transition 624 between the second graphical object 612 and the third graphical object 614. In this case, the set of ink strokes 616 depicts a rectangle-like shape. Pen indicator 620 is displayed at or near the set of ink strokes 616. For example, a virtual pen (or brush) may be selected from pen gallery 608 and used to input the set of ink strokes 616. In this case, a cursor position for the virtual pen is indicated by pen indicator 620.

Figure 6B:
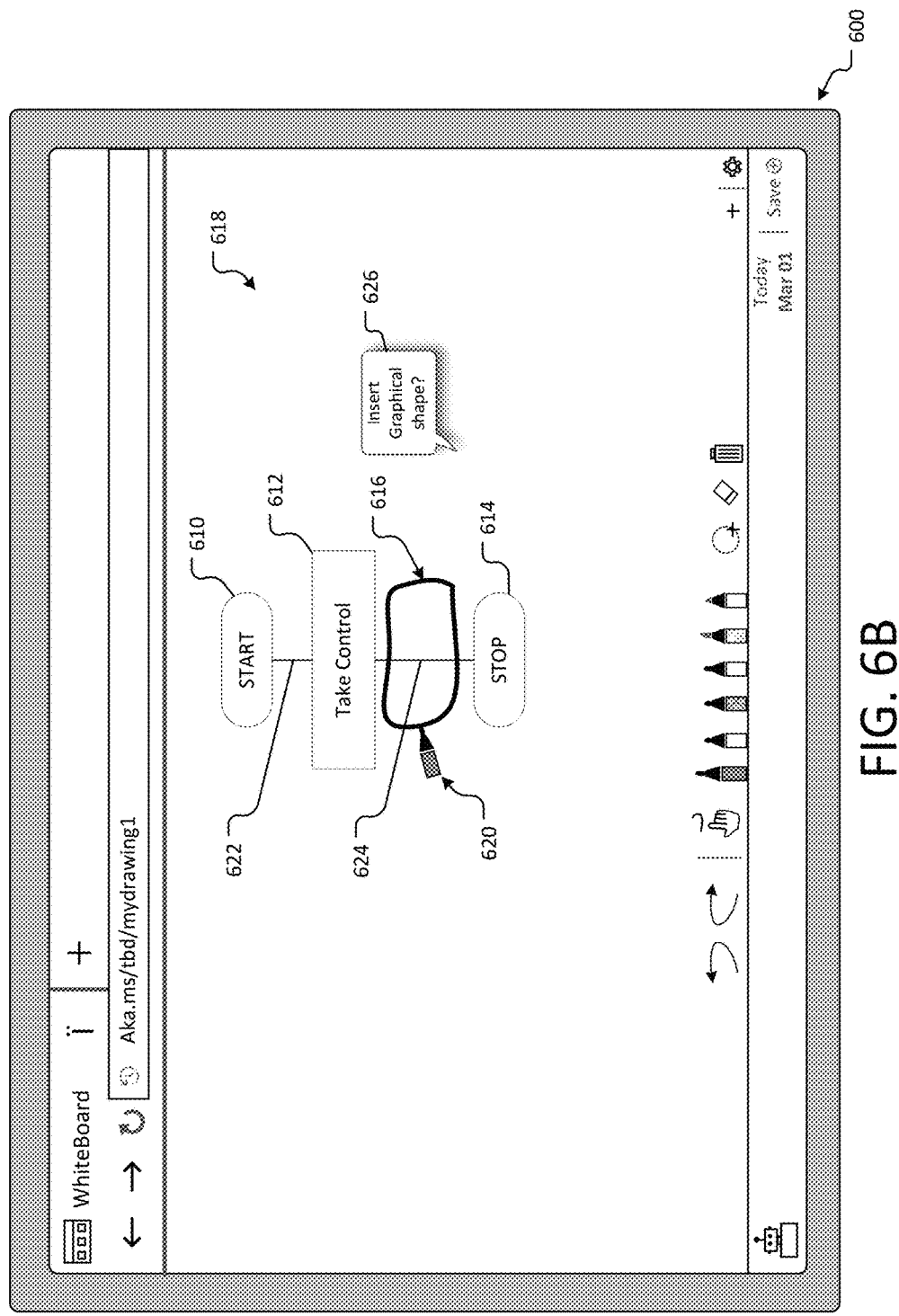

FIG. 6B depicts a second view of interface 600. When a set of ink strokes is drawn over at least a portion of a flowchart, it may be determined that the user may intend to insert a graphical object into the flowchart. In some cases, in response to determining that the user intends to insert a graphical object into the flowchart, the system may automatically insert a graphical object, as discussed further below. Alternatively, in response to determining that the user may intend to insert a graphical object into the flowchart, the system may optionally provide a prompt 626. Prompt 626 may offer an option to insert a graphical object within a flowchart.

Figure 6C:
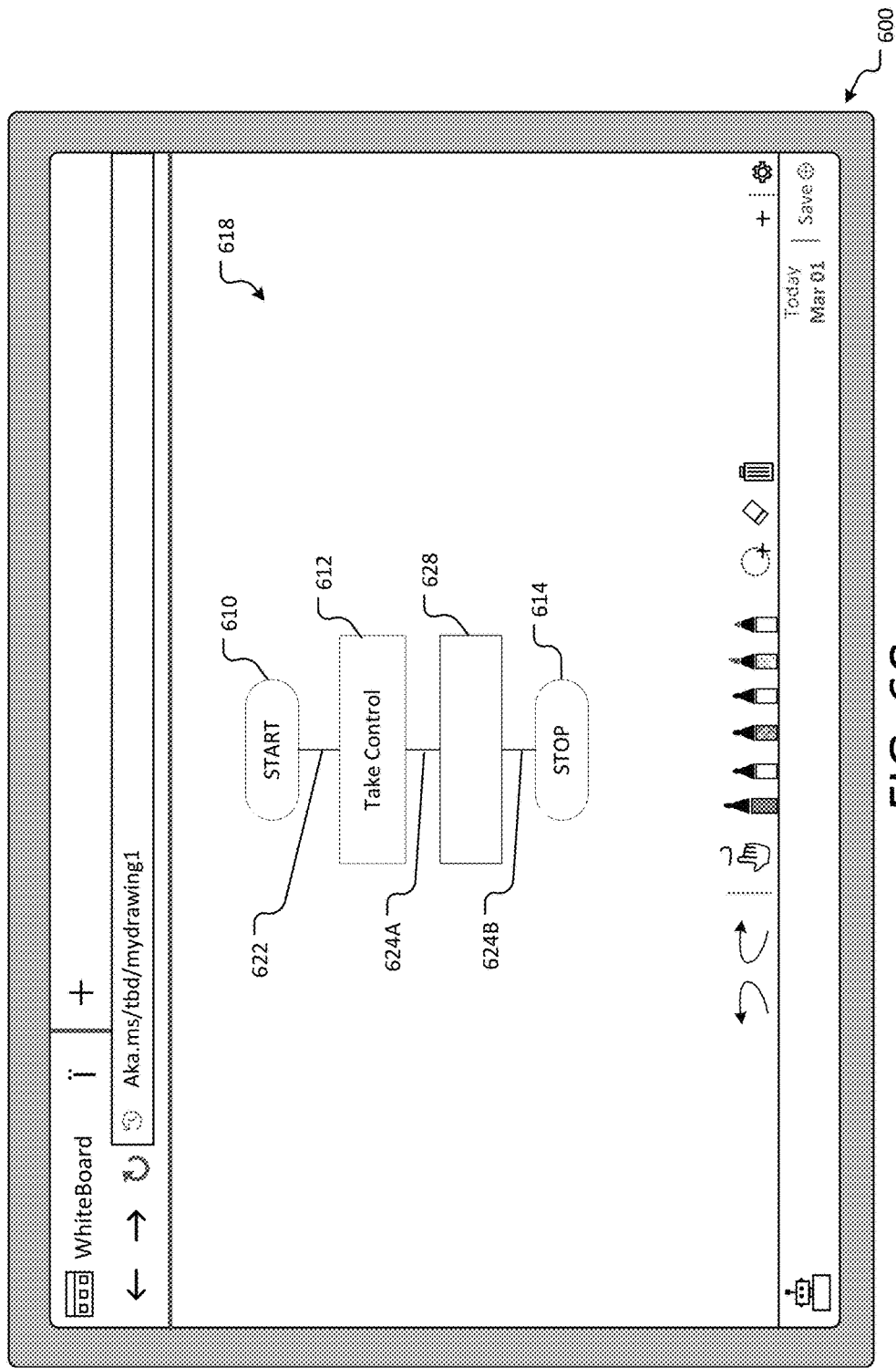

FIG. 6C depicts a third view of interface 600 in which the user has responded affirmatively to prompt 626 of FIG. 6B. In this case, a graphical rectangle 628 replaces the set of ink strokes 616 on drawing canvas 618. As described above, in response to determining a user intent to insert a graphical object within a flowchart, a shape type may be identified that corresponds to a drawn shape represented by a set of ink strokes. In this case, the set of ink strokes 616 depicted a rectangle-like shape corresponding to a rectangle shape type. Further, graphical rectangle 628 of the rectangle shape type has been selected (e.g., automatically) and replaces the set of ink strokes 616. Accordingly, the second transition 624 may be replaced by a third transition 624A and a fourth transition 624B such that the graphical rectangle 628 is positioned between the second graphical object 612 and the third graphical object 614. When the user has responded negatively to prompt 626 of FIG. 6B, the set of ink strokes 616 may remain on at least a portion of the flowchart (not shown).

Figure 6D:
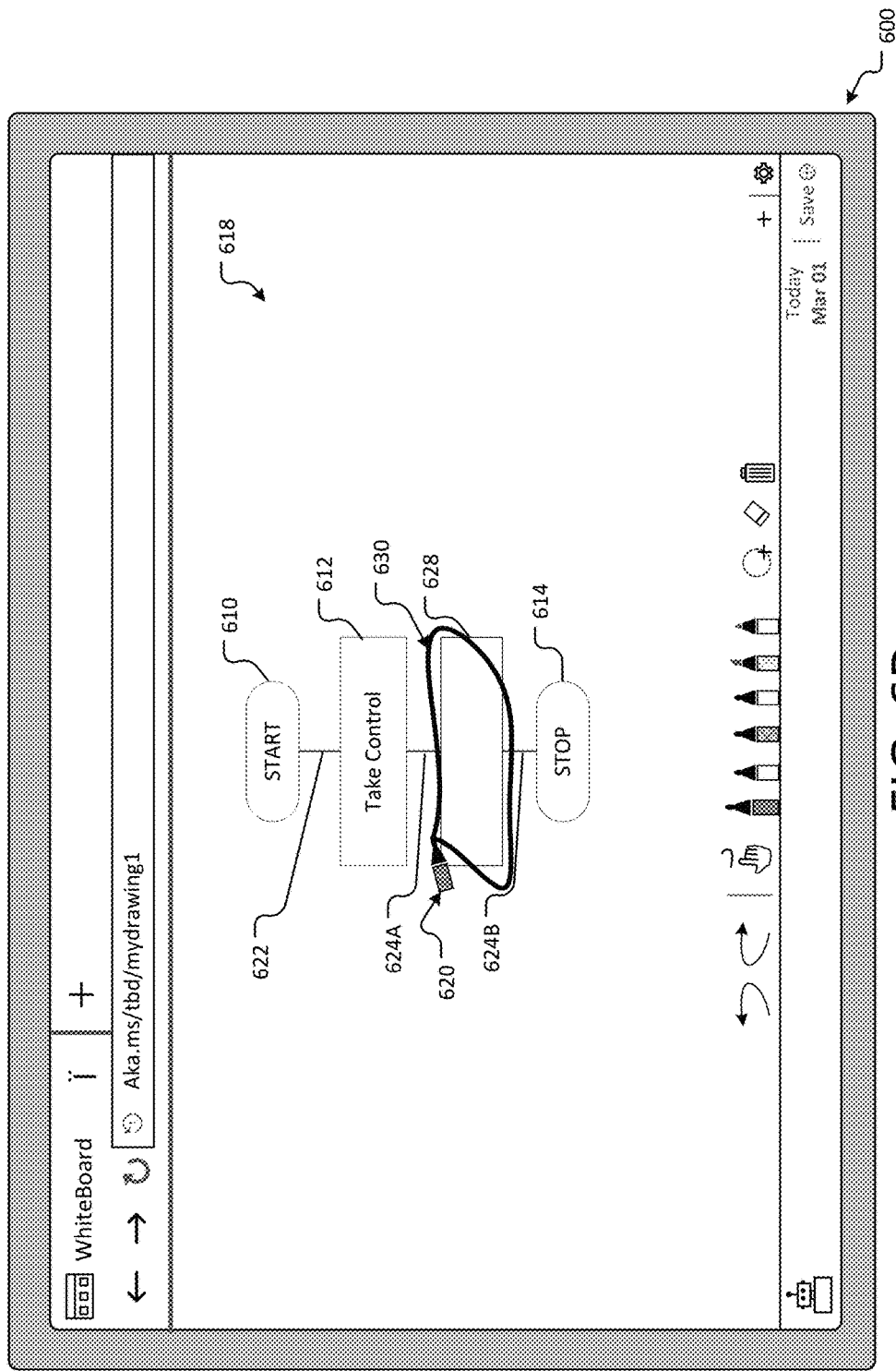

FIG. 6D depicts a fourth view of interface 600 in which a set of ink strokes 630 has been drawn over the graphical rectangle 628 in the flow chart. In this case, the set of ink strokes 630 depicts a parallelogram-like shape. Pen indicator 620 is displayed at or near the set of ink strokes 630. For example, a virtual pen (or brush) may be selected from pen gallery 608 and used to input the set of ink strokes 630. In this case, a cursor position for the virtual pen is indicated by pen indicator 620.

Figure 6E:
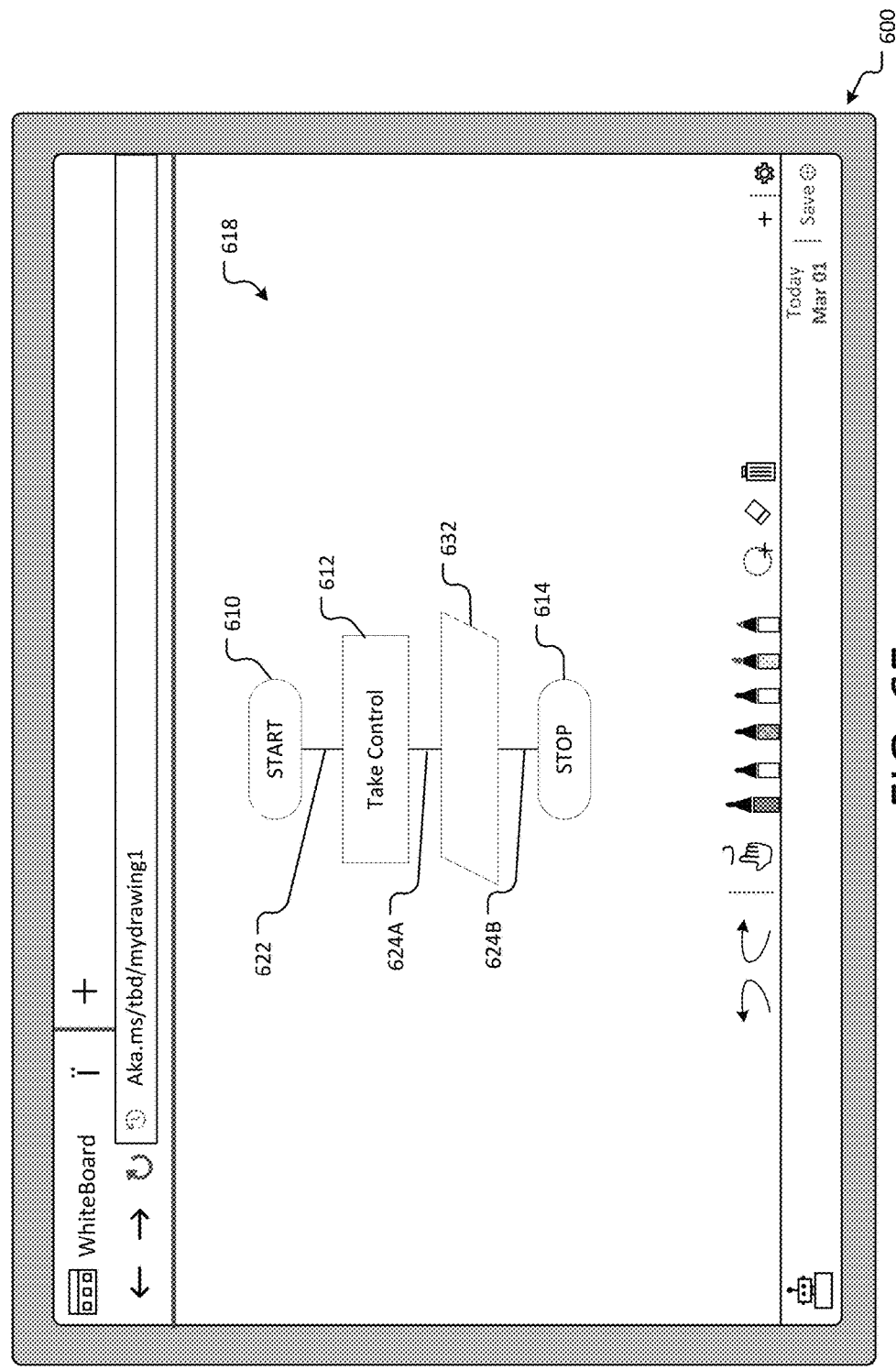

FIG. 6E depicts a fifth view of interface 600. In this case a graphical parallelogram 632 replaces the set of ink strokes 630 on drawing canvas 608. As described above, in response to receiving a set of ink strokes with a user intent to insert a graphical object within a flowchart, a shape type may be identified that corresponds to a drawn shape represented by the set of ink strokes. In this case, the set of ink strokes 630 depicted a parallelogram-like shape corresponding to a parallelogram shape type. Further, graphical parallelogram 632 of the parallelogram shape type (which may indicate input or output in a flow chart) has been selected (e.g., automatically) and replaces the set of ink strokes 630. In some cases, in response to determining that the user intends to insert a different graphical object into the flowchart (e.g., a parallelogram rather than a rectangle), the system may automatically insert the different graphical object, as discussed above. In some cases, in response to determining that the user intends to insert a different graphical object into the flowchart, the system may provide a prompt that is similar to a prompt 626 in FIG. 6B. Prompt 626 may offer an option to insert the different graphical object within a flowchart.

As should be appreciated, the various methods, devices, components, etc., described with respect to FIGS. 6A through 6E are not intended to limit the systems and methods to the particular components described. Accordingly, additional topology configurations may be used to practice the methods and systems herein and/or some components described may be excluded without departing from the methods and systems disclosed herein.

FIGS. 7-11B and the associated descriptions provide a discussion of a variety of operating environments in which aspects of the disclosure may be practiced. However, the devices and systems illustrated and discussed with respect to FIGS. 7-11B are for purposes of example and illustration and are not limiting of a vast number of computing device configurations that may be utilized for practicing aspects of the disclosure, described herein.

Figure 7:
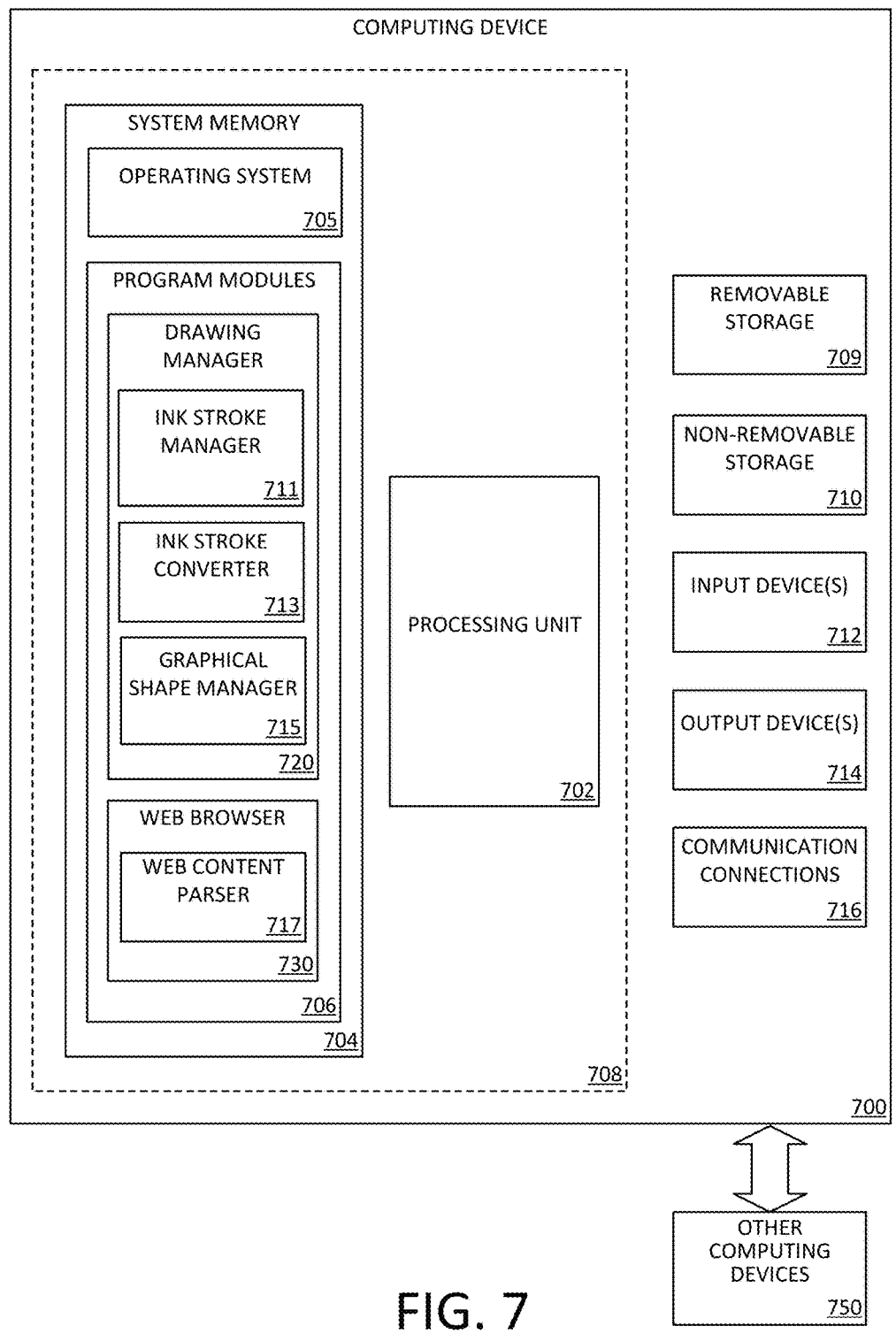
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may have computer executable instructions for implementing a drawing manager 720 on a computing device, including computer executable instructions for drawing manager 720 that can be executed to implement the methods disclosed herein. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for performing the various aspects disclosed herein. For example, the one or more program modules 706 may include a Drawing Manager 720 for managing display of one or more drawings.

As illustrated by FIG. 7, Drawing Manager 720 may include one or more components, including an Ink Stroke Manager 711 for managing sets of ink strokes for display, an Ink Stroke Converter 713 for converting sets of ink strokes into graphical objects, and a Graphical Shape Manager 715 for managing display of one or more graphical objects.

The operating system 705, for example, may be suitable for controlling the operation of the computing device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., Drawing Manager 720) may perform processes including, but not limited to, the aspects, as described herein. Other program modules that may be used in accordance with aspects of the present disclosure, and in particular for managing display of graphical objects and ink strokes, may include Ink Stroke Manager 711, Ink Stroke Converter 713, Graphical Shape Manager 715, Web Browser 730, and/or Web Content Parser 717, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include tangible media such as RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As should be appreciated, FIG. 7 is described for purposes of illustrating the present methods and systems and is not intended to limit the disclosure to a particular sequence of steps or a particular combination of hardware or software components.

Figure 8A:
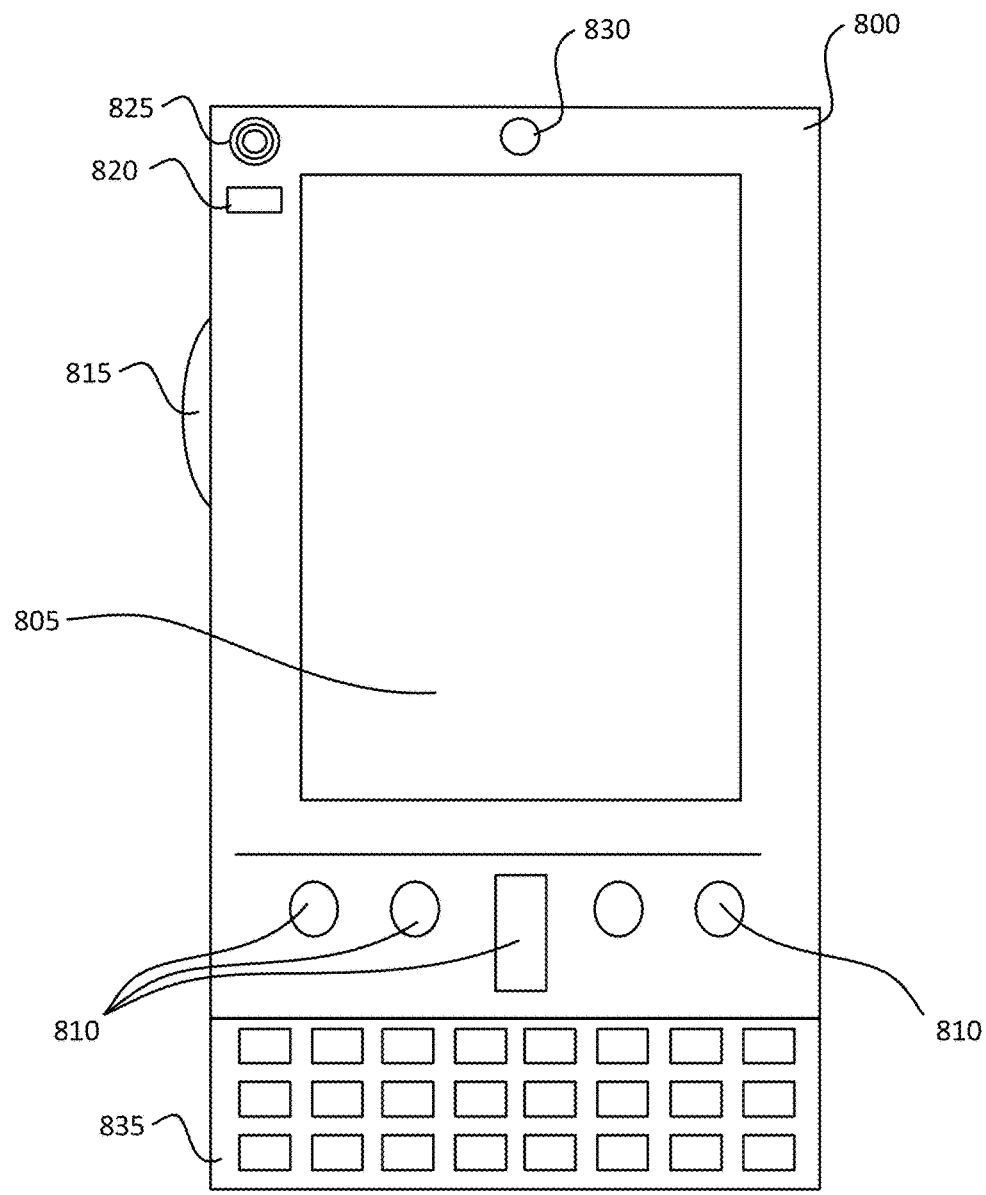
FIGS. 8A and 8B are simplified block diagrams of a mobile computing device with which aspects of the present disclosure may be practiced.
Figure 8B:
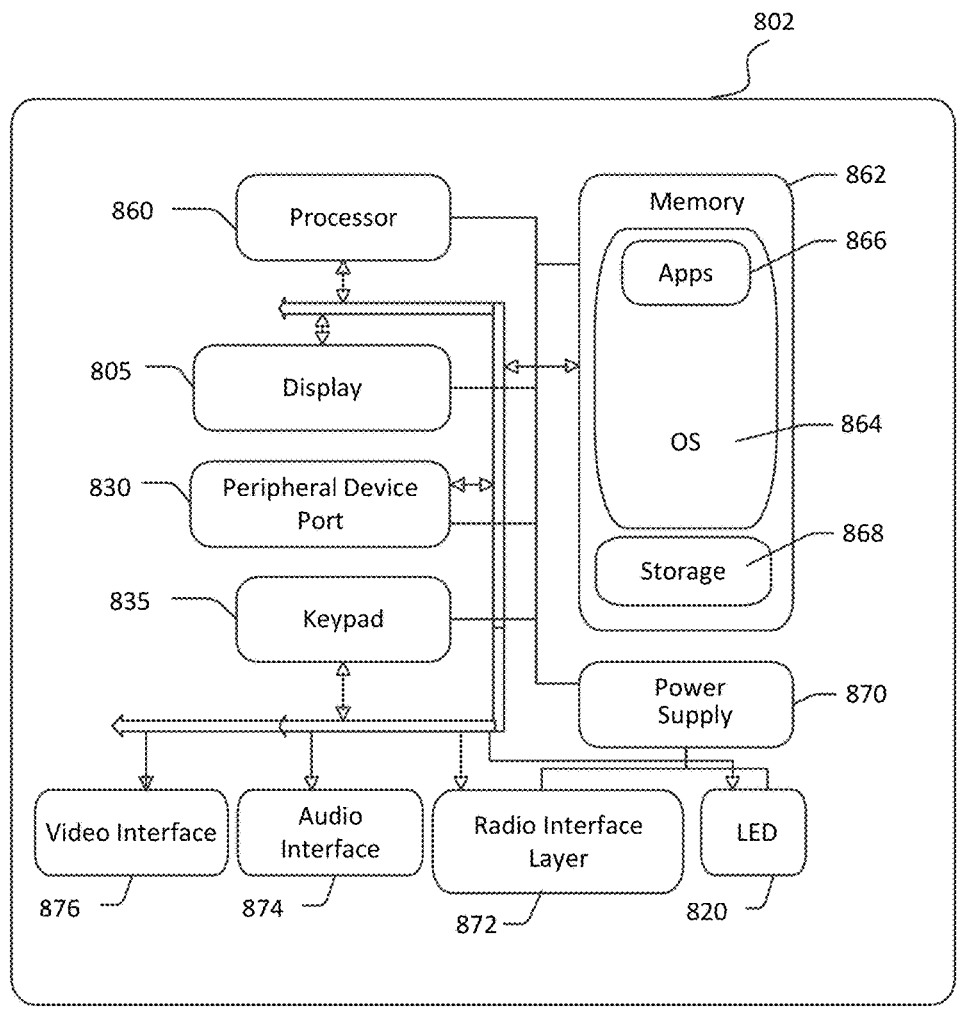

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system 802 (e.g., an architecture) to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as email or other messages used by an email application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800, including the instructions for providing a consensus determination application as described herein (e.g., message parser, suggestion interpreter, opinion interpreter, and/or consensus presenter, etc.).

The system 802 has a power supply 870, which may be implemented as one or more batteries. The power supply 870 may further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via an audio transducer 825 (e.g., audio transducer 825 illustrated in FIG. 8A). In the illustrated embodiment, the visual indicator 820 is a light emitting diode (LED) and the audio transducer 825 may be a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of peripheral device port 830 (e.g., on-board camera) to record still images, video stream, and the like. Audio interface 874, video interface 876, and keypad 835 may be operated to generate one or more messages as described herein.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/ information transfer and storage means, including electronic mail and collaborative data/information sharing systems.

As should be appreciated, FIGS. 8A and 8B are described for purposes of illustrating the present methods and systems and are not intended to limit the disclosure to a particular sequence of steps or a particular combination of hardware or software components.

Figure 9:
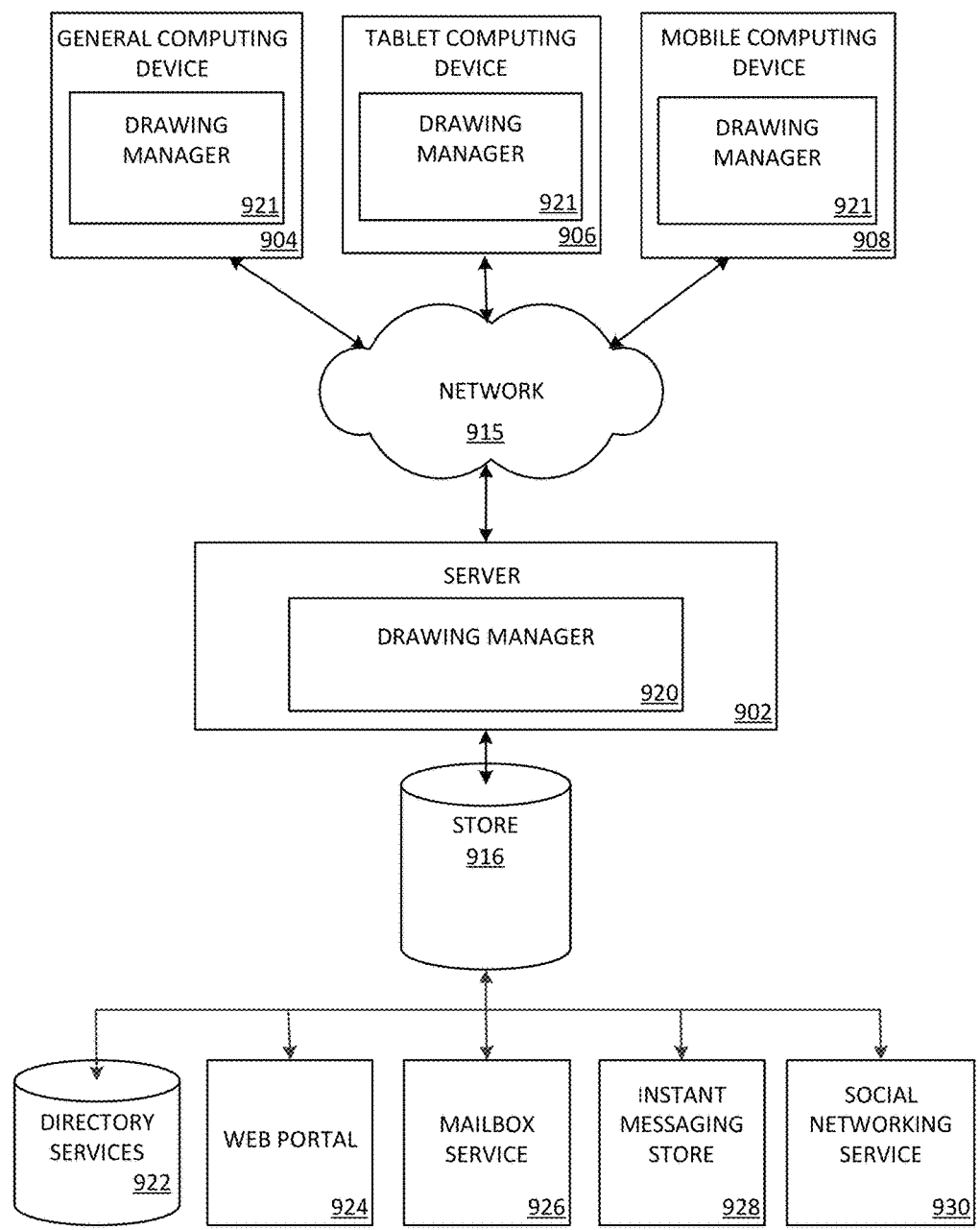
FIG. 9 is a simplified block diagram of a distributed computing system in which aspects of the present disclosure may be practiced.

FIG. 9 illustrates one aspect of the architecture of a system for processing data received at a computing system from a remote source, such as a general computing device 904 (e.g., personal computer), tablet computing device 906, or mobile computing device 908, as described above. Content displayed at server device 902 may be stored in different communication channels or other storage types. For example, various messages may be received and/or stored using directory services 922, a web portal 924, a mailbox service 926, an instant messaging store 928, or a social networking service 930. The drawing manager 921 may be employed by a client that communicates with server device 902, and/or the drawing manager 920 may be employed by server device 902. The server device 902 may provide data to and from a client computing device such as a general computing device 904, a tablet computing device 906 and/or a mobile computing device 908 (e.g., a smart phone) through a network 915. By way of example, the computer system described above with respect to FIGS. 1-5 may be embodied in a general computing device 904 (e.g., personal computer), a tablet computing device 906 and/or a mobile computing device 908 (e.g., a smart phone). Any of these embodiments of the computing devices may obtain content from the store 916, in addition to receiving graphical data useable to either be pre-processed at a graphic-originating system or post-processed at a receiving computing system.

As should be appreciated, FIG. 9 is described for purposes of illustrating the present methods and systems and is not intended to limit the disclosure to a particular sequence of steps or a particular combination of hardware or software components.

Figure 10:
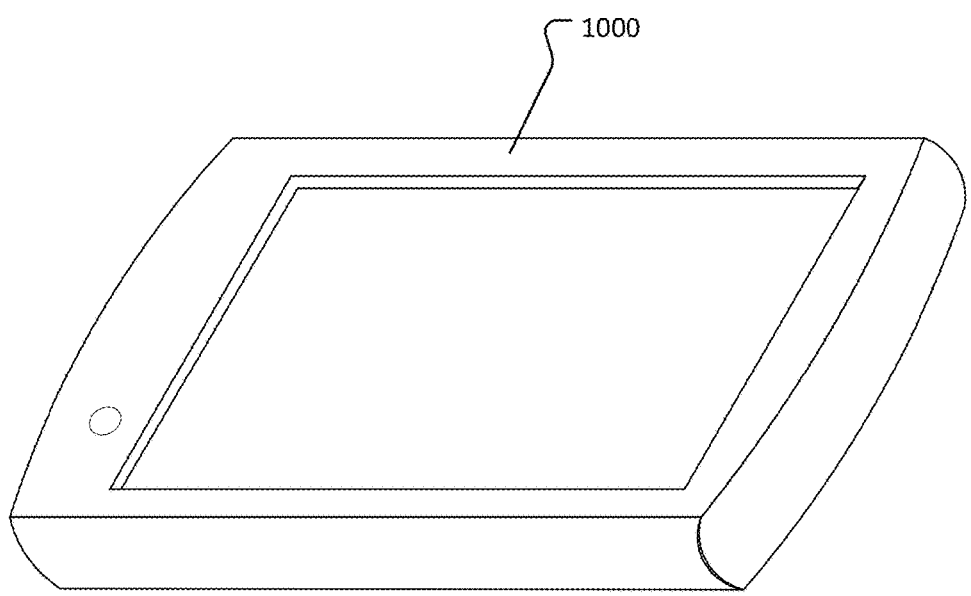
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 10 is described for purposes of illustrating the present methods and systems and is not intended to limit the disclosure to a particular sequence of steps or a particular combination of hardware or software components.

FIGS. 11A and 11B illustrate suitable computing devices for implementing the systems and methods described herein. FIG. 11A illustrates a large-screen interactive computing device 1100A (e.g., a Microsoft® Surface Hub® or other large-screen, touch-enabled display) for executing one or more aspects of the present disclosure. FIG. 11B illustrates a plurality of interoperative computing devices 1100B that provide a tiled screen display for executing one or more aspects of the present disclosure. As illustrated, the plurality of interoperative computing devices 1100B may be coordinated to display a single screen image 1102, or any other display. The large-screen interactive computing device 1100A and/or the plurality of interoperative computing devices 1100B may further incorporate any of the hardware and/or software described with respect to FIGS. 1-10. Further, large-screen interactive computing device 1100A and/ or the plurality of interoperative computing devices 1100B may implement any of the features or functions described with respect to FIGS. 1-10. As should be appreciated, the large-screen interactive computing device 1100A and/or the plurality of interoperative computing devices 1100B may represent different embodiments of an electronic whiteboard, as described herein.

The exemplary computing devices 1100A and/or 1100B may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIGS. 11A and 11B are described for purposes of illustrating the present methods and systems and are not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method of converting one or more ink strokes into a graphical object, the method comprising:
   receiving a first ink stroke;
   receiving a second ink stroke;
   determining that the second ink stroke substantially overlaps the first ink stroke based at least in part on determining that the second ink stroke overlaps the first ink stroke by a predetermined percentage;
   determining a geometric shape associated with a combination of the second ink stroke substantially overlapping the first ink stroke;
   identifying a graphical object corresponding to the geometric shape; and
   replacing the first ink stroke and the second ink stroke with the graphical object.

2. The computer-implemented method of claim 1, wherein a first set of ink strokes comprises at least the first ink stroke.

3. The computer-implemented method of claim 1, wherein determining substantial overlap further comprises:
   determining that the second ink stroke overlaps the first ink stroke by more than a threshold.

4. The computer-implemented method of claim 3, wherein the threshold comprises a percentage, and wherein the percentage is within a range from 51% to 100%.

5. The computer-implemented method of claim 3, wherein the predetermined percentage is within a range from 51% to 100%.

6. The computer-implemented method of claim 4, further comprising:
   determining that the second ink stroke is received within a threshold time period after the first ink stroke.

7. The computer-implemented method of claim 1, wherein the graphical object comprises of a graphical transition and a graphical shape.

8. The computer-implemented method of claim 1, wherein identifying the graphical object further comprises:
   comparing the geometric shape to a database of graphical objects.

9. The computer-implemented method of claim 1, wherein replacing the first ink stroke and the second ink stroke with the graphical object further comprises:
   erasing the first ink stroke; and
   erasing the second ink stroke.

10. A system comprising:
    processor; and
    a memory encoding computer executable instructions that, when executed by the processor, cause the system to perform a method for converting ink stroke into a graphical object, the method comprising:
    receiving an ink stroke, wherein the ink stroke overlaps at least a portion of a graphical flowchart;
    determining a geometric shape associated with a combination of the ink stroke and at least the portion of the graphical flowchart;
    identifying a graphical object corresponding to the geometric shape, wherein the graphical object corresponds to at least one other graphical object in the flowchart; and
    replacing the ink stroke with the graphical object in the flowchart.

11. The system of claim 10, wherein the graphical object comprises at least one of a graphical transition and a graphical shape.

12. The system of claim 10, wherein identifying the at least one graphical object corresponding to the geometric shape further comprises:
    comparing the geometric shape to a database of graphical objects.

13. The system of claim 10, wherein replacing the ink stroke further comprises erasing the ink stroke.

14. A computer-readable storage device storing computer-executable instructions that when executed by a processor cause the processor to:
    receive a first ink stroke;
    receive a second ink stroke;
    determine that the second ink stroke substantially overlaps the first ink stroke based at least in part on determining that a pixel distance between the second ink stroke and the first ink stroke is less than a threshold;
    determine a geometric shape associated with a combination of the first ink stroke and the second ink stroke;
    identify a graphical object corresponding to the geometric shape; and
    replace the first ink stroke and the second ink stroke with the graphical object.

15. The computer-readable storage device of claim 14, wherein a first set of ink strokes comprises at least the first ink stroke.

16. The computer-readable storage device of claim 14, wherein determining substantial overlap further comprises:
    determining that the second ink stroke overlaps the first ink stroke by more than a threshold.

17. The computer-readable storage device of claim 14, wherein the threshold comprises a percentage, and wherein the percentage is within a range from 51% to 100%.

18. The computer-readable storage device of claim 14, wherein the graphical object comprises of a graphical transition and a graphical shape.

19. The computer-readable storage device of claim 14, wherein identifying the graphical object further comprises:
    comparing the geometric shape to a database of graphical objects.

20. The computer-readable storage device of claim 14, wherein replacing the first ink stroke and the second ink stroke with the graphical object further comprises:
    erasing the first ink stroke; and
    erasing the second ink stroke.

* * * * *